United States Patent
Capps

(10) Patent No.: US 12,450,676 B2
(45) Date of Patent: Oct. 21, 2025

(54) FIRE SERVICE AND EQUIPMENT INSPECTION TEST AND MAINTENANCE SYSTEM AND METHOD

(71) Applicant: David Sean Capps, San Diego, CA (US)

(72) Inventor: David Sean Capps, San Diego, CA (US)

(*) Notice: Subject to any disclaimer, the term of this patent is extended or adjusted under 35 U.S.C. 154(b) by 0 days.

(21) Appl. No.: 17/672,649

(22) Filed: Feb. 15, 2022

(65) Prior Publication Data
US 2022/0188955 A1    Jun. 16, 2022

Related U.S. Application Data

(63) Continuation-in-part of application No. 14/880,209, filed on Oct. 10, 2015, now Pat. No. 11,805,170.

(51) Int. Cl.
| | |
|---|---|
| G06Q 50/26 | (2012.01) |
| A62C 37/50 | (2006.01) |
| G06Q 10/0637 | (2023.01) |
| H04L 67/10 | (2022.01) |

(52) U.S. Cl.
CPC .......... G06Q 50/265 (2013.01); A62C 37/50 (2013.01); G06Q 10/0637 (2013.01); H04L 67/10 (2013.01)

(58) Field of Classification Search
None
See application file for complete search history.

(56) References Cited

U.S. PATENT DOCUMENTS

| | | | | |
|---|---|---|---|---|
| 6,675,091 B2* | 1/2004 | Navab | ................. | G01C 21/206 |
| | | | | 701/515 |
| 7,483,917 B2* | 1/2009 | Sullivan | ................. | G06F 16/29 |
| | | | | 707/999.102 |
| 7,649,450 B2* | 1/2010 | Campion, Jr. | ........ | G08B 29/145 |
| | | | | 340/506 |
| 7,832,638 B2* | 11/2010 | Wetzel | .................... | G07C 1/20 |
| | | | | 235/385 |
| 7,924,149 B2* | 4/2011 | Mendelson | ............ | G06Q 90/20 |
| | | | | 340/572.1 |
| 8,059,151 B2* | 11/2011 | Ersue | ................. | G01N 21/9515 |
| | | | | 348/86 |
| 8,210,047 B2* | 7/2012 | McSheffrey, Jr. | ..... | A62C 37/50 |
| | | | | 73/753 |
| 8,271,321 B1* | 9/2012 | Kestenbaum | .......... | G06Q 10/10 |
| | | | | 705/14.1 |

(Continued)

FOREIGN PATENT DOCUMENTS

WO    WO-2009105603 A1 *   8/2009   ............ G08B 25/14

*Primary Examiner* — Lashonda Jacobs-Burton
(74) *Attorney, Agent, or Firm* — Robert Cantrell; José W. Jimenez; JIMENEZ LAW FIRM

(57) ABSTRACT

A system and method for documenting, monitoring, testing, inspecting, maintaining, and using fire equipment located at facilities including people, organizations, and properties as a part of users, places, and tools. The system and method operate via at least one computer, network, and user interface wherein the organization of data about users, places, and tools allows a user to assess the state and changes in states of users, places, and tools from which to make decisions about maintaining and using fire equipment and take associated action to fight fires and handle other emergencies. The system and method may further use machine learning and the Internet of Things to obtain, assess, and deploy data and tools.

18 Claims, 44 Drawing Sheets

(56) References Cited

U.S. PATENT DOCUMENTS

| | | | | |
|---|---|---|---|---|
| 8,311,510 B2* | 11/2012 | Cradick | ................ | H04W 76/50 340/531 |
| 8,538,687 B2* | 9/2013 | Plocher | ................ | G01C 21/20 701/434 |
| 8,706,718 B2* | 4/2014 | Gerstner | ................ | G06F 16/29 707/723 |
| 8,810,387 B2* | 8/2014 | Hall | ................ | G08B 29/12 340/508 |
| 8,842,016 B1* | 9/2014 | Cazanas | ................ | G06Q 10/20 42/70.07 |
| 9,041,534 B2* | 5/2015 | McSheffrey | ................ | A62C 13/76 340/286.07 |
| 9,467,662 B2* | 10/2016 | Childers | ................ | H04N 7/181 |
| 9,552,720 B2* | 1/2017 | Moffa | ................ | G08B 25/14 |
| 9,672,486 B1* | 6/2017 | Turpin | ................ | G01N 21/8851 |
| 9,767,679 B2* | 9/2017 | Piccolo, III | ................ | G08B 29/145 |
| 10,048,077 B2* | 8/2018 | Direkwut | ................ | G01C 21/3852 |
| 10,097,982 B2* | 10/2018 | Kwan | ................ | H04W 76/14 |
| 10,216,164 B2* | 2/2019 | Brown | ................ | G08B 29/145 |
| 11,126,966 B2* | 9/2021 | Moren | ................ | G06Q 30/018 |
| 2003/0065522 A1* | 4/2003 | Wepfer | ................ | G06Q 10/0875 705/29 |
| 2003/0116329 A1* | 6/2003 | McSheffrey | ................ | A62C 13/76 169/30 |
| 2004/0065451 A1* | 4/2004 | McSheffrey | ................ | A62C 37/50 169/30 |
| 2005/0006109 A1* | 1/2005 | McSheffrey | ................ | A62C 13/76 340/531 |
| 2005/0108038 A1* | 5/2005 | Cober | ................ | G06Q 90/205 705/324 |
| 2006/0108241 A1* | 5/2006 | Smith | ................ | A62B 99/00 206/214 |
| 2007/0208438 A1* | 9/2007 | El-Mankabady | ...... | G05B 15/02 700/83 |
| 2007/0219645 A1* | 9/2007 | Thomas | ................ | G05B 15/02 700/29 |
| 2008/0021718 A1* | 1/2008 | Kaartinen | ................ | G06Q 50/265 705/325 |
| 2008/0071392 A1* | 3/2008 | Brown | ................ | G05B 15/02 700/23 |
| 2008/0084291 A1* | 4/2008 | Campion | ................ | G08B 29/145 340/514 |
| 2008/0314681 A1* | 12/2008 | Patel | ................ | A62B 3/00 182/18 |
| 2009/0319180 A1* | 12/2009 | Robinson | ................ | G06Q 10/10 701/532 |
| 2010/0153168 A1* | 6/2010 | York | ................ | G06Q 10/0637 705/28 |
| 2010/0174974 A1* | 7/2010 | Brisebois | ................ | G06Q 10/00 715/780 |
| 2010/0185549 A1* | 7/2010 | York | ................ | G06Q 10/0637 705/317 |
| 2012/0065944 A1* | 3/2012 | Nielsen | ................ | G06Q 50/06 703/1 |
| 2012/0154141 A1* | 6/2012 | Piccolo, III | ................ | G08B 25/14 340/539.11 |
| 2012/0188076 A1* | 7/2012 | McSheffrey | ................ | F17C 13/02 340/539.17 |
| 2012/0260313 A1* | 10/2012 | Gomez | ................ | H04L 63/08 707/E17.032 |
| 2012/0320058 A1* | 12/2012 | Stephen | ................ | G06T 15/20 345/428 |
| 2013/0176124 A1* | 7/2013 | Brinton | ................ | G06Q 10/20 340/539.13 |
| 2013/0262497 A1* | 10/2013 | Case | ................ | H04L 67/01 715/224 |
| 2014/0032433 A1* | 1/2014 | Eick | ................ | G06Q 10/10 705/314 |
| 2014/0130140 A1* | 5/2014 | Abhyanker | ................ | G06Q 30/02 726/4 |
| 2014/0243036 A1* | 8/2014 | Kouwe | ................ | H04M 11/04 455/521 |
| 2014/0258825 A1* | 9/2014 | Ghosh | ................ | G06V 30/40 715/222 |
| 2014/0331176 A1* | 11/2014 | Cheng | ................ | G09B 29/106 715/808 |
| 2015/0002290 A1* | 1/2015 | Wang | ................ | G08B 29/043 340/506 |
| 2015/0335927 A1* | 11/2015 | McManama | ........... | A62C 37/50 340/691.8 |
| 2017/0004427 A1* | 1/2017 | Bruchal | ................ | G06Q 10/06311 |
| 2017/0104823 A1* | 4/2017 | Capps | ................ | H04L 67/52 |
| 2021/0287318 A1* | 9/2021 | Sterpin | ................ | H04W 4/33 |

* cited by examiner

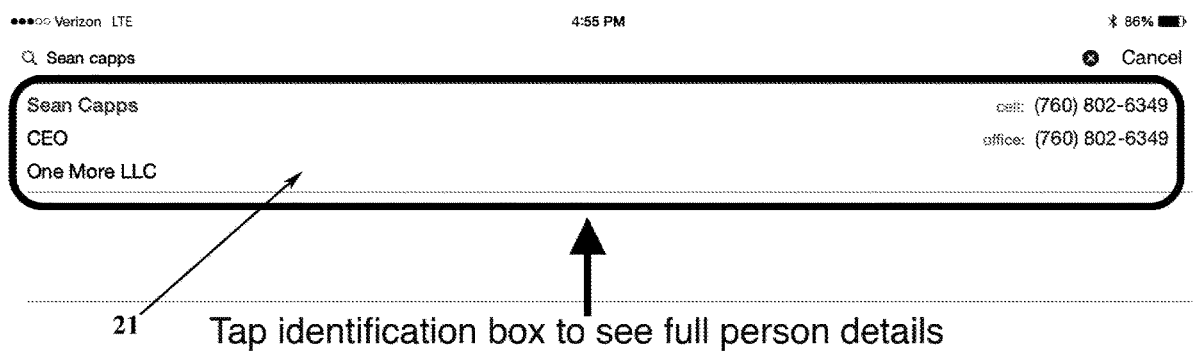
21  Tap identification box to see full person details
FIG.2

| | 9:02 PM | 37% |
|---|---|---|
| ●●○○○ Verizon 🔡 | Organizations | + |

🔍 Search

4049 Avenido de la plata • Oceanside • CA • 92056        (760) 945-7807

ADT

Alarms Unlimited        1 (800) 252-7678
4584 Park Boulevard • San Diego • California • 92116        info@alarmsu.com

Calenergy
7030 Gentry RD. • Calipatria • CA • 92233

Cassidy Turley (L "Open Tab to View complete organization information" (858) 546-5400

One More LLC        (760) 802-6349
        developer@digitalfireprotection.com

Emerson        (858) 695-9551
5909 Sea Lion Place, Suite C • Carlsbad • CA • 92010        jeff.daniels@emerson.com

Gilead Science        (760) 945-7807
4049 Avenido de la plata • Oceanside • CA • 92056

Hampton
321 Main Street • Anytown • CA • 90909

80 ↙    81

People    Orgs    Properties

FIG. 8

●●○○○ Verizon 🔍        9:05 PM        38% 🔋⚡

Properties     121 ⟶ +

8880 Recho Rd • San Diego • CA • 92121     Map 3888 genesee ave • San Diego • CA • 92111     Map Map

SDSU
5500 Campanile Dr, • San Diego • CA • 92182     Map

5005 Texas st
5005 Texas st • San Diego • CA • 92108     Map

6034 & 6024 kantor st
6034 kantor st • San Diego • CA • 92122     Map

A - Ozate Office (San Juan Capistrano)
501 Rio Street • San Juan Capistrano • CA • 92675     Map

Ageia
910 N Pacific Street • Oceanside • CA • 92054     Map

ARO Partners
2232 Versus St • San Diego • CA • 92154     Map

Cal Energy
7030 gentry rd. • Calipatria • CA • 92233     Map

People    Orgs    Properties

FIG.12

| Date: 3/23/15 | Salesmen: Sean Capps     proposal # 1141 |
|---|---|
| PWIP<br>c/o Phase 3 Properties Inc.<br>PO BOX 927729<br>San Diego, CA 92192 | Contact: Corrine Gulutz<br>Tel: 858-546-0888<br>Email: gulutz@phase3properties.com<br>gulutz@p3re.com<br>Work address: 315-325 Weakley Road & 2361-2365 Portico Blvd, Calexico, CA |

We are pleased to provide our price to perform the following scope of work, please select from the following options:

- ☐ NovaMex required repairs $2,170.00
- ☐ NovaMex required and recommended repairs $4,460.00

- ☐ Spreckles required repairs $3,187.00
- ☐ Spreckles required and recommended repairs $4,482.00

- ☐ Clover required repairs $3,146.00

- ☐ Fire Pump Room required repairs $2,642.00

SCOPE OF WORK –
- Provide tools, material and labor to perform repairs from 5 year inspection dated 3-4-15.

INCLUSIONS –
1. All labor and equipment to perform the repairs listed above.
2. Lift (for recommended repairs).

EXCLUSIONS –
1. Containment, filtering or off-site disposal of water discharge or drained from the fire sprinkler system(s) including any costs or fines associated with such.
2. Paint, patch or repair due to installation.
3. Modifications or upgrades to existing system.
4. Hydraulic calculations.
5. PIV repairs exclude replacement parts and underground excavation. Repair existing only- deep lube service.

QUALIFICATIONS –
1. All work to be completed during normal business hours M-F 7AM to 3:30 PM
2. Net payment 30 days.
3. This proposal may be withdrawn if not accepted within 30 days.
4. Additional trip charges will apply if recommended repairs are completed separate from required repairs.

*If you wish to proceed with this proposal please sign, date and return.*

Sean Capps
Western Fire Protection Service

Acceptance : _____
Print Name: _____
Signature      Date

Western Fire Protection, Inc.

FIG. 29

JOB NAME: PWIP  
INSPECTION DATE: 3/4/15

JOB NUMBER: ITC-01007  
INSPECTOR: Jack C. and Sean A.

| Location | Description |
|---|---|
| *Required repairs* | $2,170.00 |
| 1 NovaMex - Warehouse | (4) - 1 1/2" Rack Hose are 2007 (1) 1 1/2" Rack Hose are 2004 |
| 2 NovaMex | System 2 Bell Doesn't ring |
| *Recommended repairs* | *Not required for certification* |
| 3 NovaMex - Warehouse Break Room & Storage Room | Add sprinkler head $995.00 |
| 4 NovaMex - Driver Check In | Add (2) sprinkler heads $1,295.00 |

| Location | Description |
|---|---|
| *Required repairs* | $3,187.00 |
| 1 Spreckels - Warehouse | (7) 2007 1 1/2" Rack Hose |
| 2 Spreckels | (2) Bell signs missing |
| 3 Spreckels | System 2 PIV Frozen |
| *Recommended repairs* | *Not required for certification* |
| 4 Spreckels - Warehouse | Add (2) sprinkler heads $1,295.00 |

| Location | Description |
|---|---|
| *Required repairs* | $3,146.00 |
| 1 Clover 325 Bldg | Office (6) 1/2" 155* QR SRC Globe |
| 2 Clover 325 Bldg - North end warehouse 1st&2nd Floor | (15) 1/2" 155* QR SRC Globe |
| 3 Clover 325 Bldg - Warehouse | (1) 1 1/2" Rack Hose 2007 SE Corner |
| 4 Clover 325 | Bell did not ring |
| 5 Clover 325 | PIV Frozen |
| 6 Clover 315 Bldg | (3) 1 1/2" Rack Hose 2007 |
| 7 Clover 315 Bldg - Lobby Mens Room | (1) 1/2" 155* QR SRC Viking Corroded |
| 8 Clover 315 | PIV Frozen |

| Location | Description |
|---|---|
| *Required repairs* | $2,642.00 |
| 9 Fire Pump Room | 8" Butterfly Valve does not close all the way supply to 315 & 325 |

Western Fire Protection, Inc.

FIG. 30

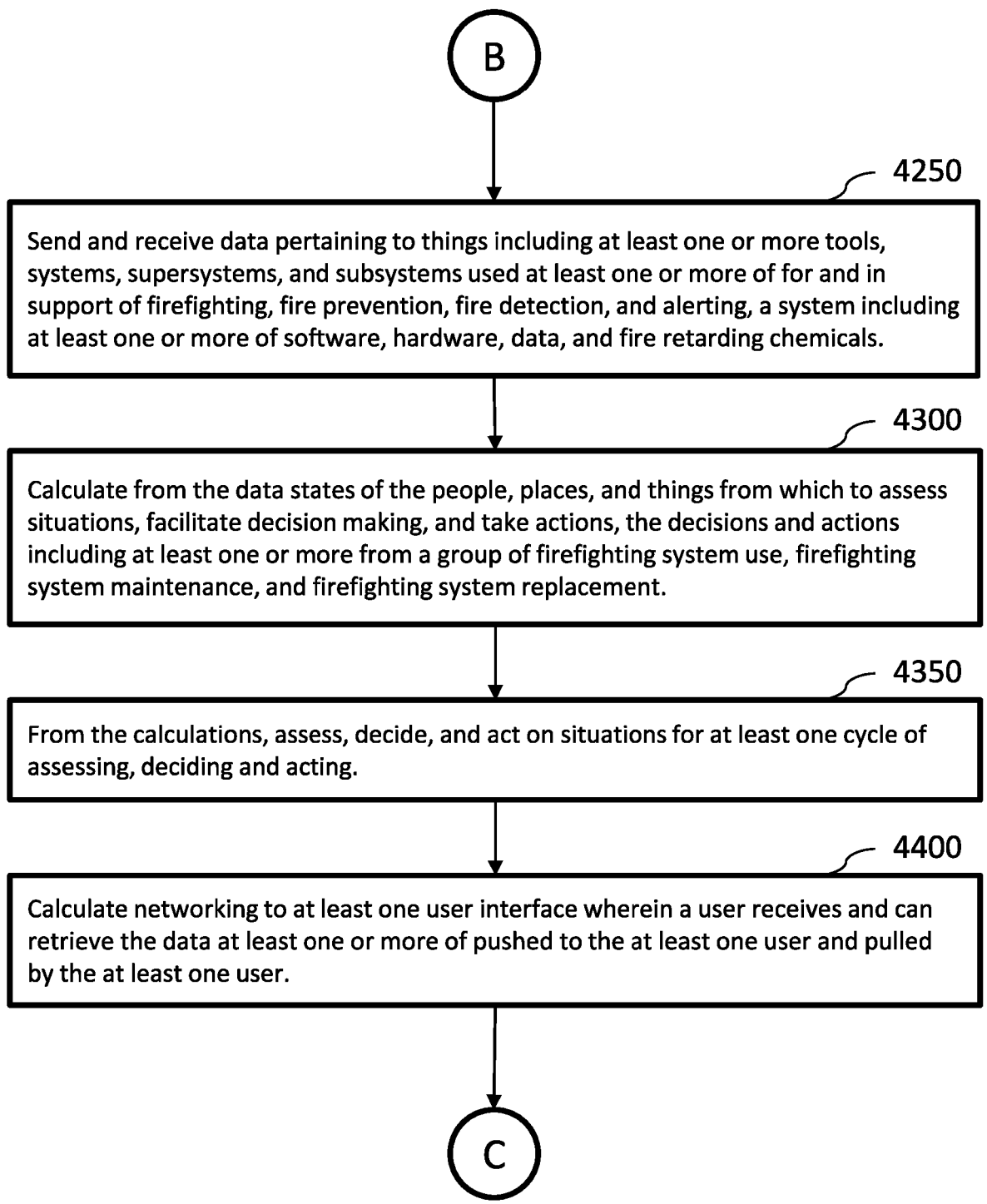

FIRE SERVICE AND EQUIPMENT INSPECTION TEST AND MAINTENANCE SYSTEM AND METHOD

CLAIM OF PRIORITY

This application claims priority to and the benefit of U.S. application Ser. No. 14/880,209 filed on Oct. 10, 2015, with the title FIRE SERVICE AND EQUIPMENT INSPECTION TEST AND MAINTENANCE SYSTEM, which is incorporated herein by reference in its entirety.

FIELD OF THE INVENTION

The present invention relates to fire equipment, and in particular, to locations, mapping, maintenance, and coordinated use of fire equipment.

BACKGROUND

As part of modern society, buildings and structures are required to have fire equipment on the premises. Fire sprinkler systems, fire alarm systems, fire extinguishers, and other fire safety equipment must be properly located and maintained. Business owners must be very careful to ensure that their equipment meets any legal obligations as well as obligations required by insurance companies. Often, business owners rely on fire service companies to conduct fire equipment inspections, advise customers of deficiencies, and conduct repairs. Fire service companies have the expertise and the resources to effectively maintain multiple customers. But as the number of customers increases, and the amount of fire equipment increases, it becomes more challenging to efficiently track and monitor everything required.

Added are requirements for the proficient use of fire and safety equipment considering that the better firefighters command space, time, equipment, and risk, the better their odds of achieving a positive firefighting outcome. Acting even a few seconds earlier than otherwise can determine whether lives and structures are saved. Therefore, there currently exists a need in the market for improved systems and methods for locating, mapping, maintaining, and coordinating the use of fire equipment.

SUMMARY OF THE INVENTION

The present invention provides a system for monitoring, testing, inspecting, and maintaining fire equipment located at the property of secondary customers. Secondary customers include people, organizations, and properties, added that these people, organizations, and properties may fall into categories of users, places, and tools, to be further detailed. The system saves information collected on a server computer accessible via a computer network. This information is reviewable and editable by primary customers. In one embodiment, the server computer is disposed in the cloud and the computer network is substantially the Internet. In a representative embodiment, primary customers include fire inspection/repair/monitoring companies and fire departments using mobile computer devices. In another embodiment, the software application has a customer relationship management tool allowing fire equipment, people, properties, and organizations to be easily associated with one another. In another embodiment, each piece of fire equipment is geographically mapped to a specific location via GPS or other mapping reference. Additionally, fire equipment associated with a specific property, building, or floor has relevant information digitally captured and recorded into the cloud database. In another embodiment, a fire department accesses fire equipment information during an exercise or emergency to direct responders. In another embodiment, secondary customers with authorized access receive data and information regarding the status of the fire safety equipment and receive analysis and recommendations from the service entities. Primary customers receive data and information regarding the status of fire safety equipment from the cloud database, and transmit analysis, records, and recommendations to the secondary customers.

Further disclosed is a system and method for firefighting and fire prevention of structures that includes at least one computer processor and memory system operationally accessible by at least one networked computerized device. At least one database is accessible by the at least one computer processor designed to send and receive data collected on at least one or more from the group of: users, places, and tools, the data further including datapoints from which to calculate qualities of the users, places, and tools from at least one or more from a group consisting of who, what, when, where, why, how, cost, power, environment, and event-conditions from which to calculate at least one or more of past, present, projected-future states and rates of change of the users, places, and tools. Users include at least one or more from a group of: firefighters, maintenance technicians, facilities managers, and members of associated business entities. Places include at least one or more from a group of: installation facilities, supply facilities, vehicles, power generation, resource transmission, nexus of work, and points of control. Tools include at least one or more of firefighting, fire prevention, fire detection, and alerting, supersystems, systems, and subsystems, a system including at least one or more of software, hardware, vehicles, data, and fire retarding chemicals. The at least one computer processor and memory system is further networked to at least one user interface wherein a user receives and can retrieve calculations of states of the users, places, and tools from which to assess situations, facilitate decision making, and take actions, the decisions and actions including at least one or more from a group of: firefighting system use, firefighting system maintenance, and firefighting system replacement. The data is at least one or more of pushed to the at least one user and pulled by the at least one user and may indicate its presence to a user by at least one or more of visually, audibly, and through vibration. The data is updated between, inclusively, periodically to substantially continuously by at least one or more from a group of: manually, automatically, and by at least one or more sensor members, the at least one or more sensor members including at least one or more from a group of: visual, audible, pressure, motion, acceleration, temporal, seal, connection, heat, particle, chemical, radio, radiation, electricity, biometric, global positioning, and computer readable code. The data is measured against at least one or more of safety codes, codes of compliance, vendor codes, performance standards, and industry standards.

In one embodiment of the system for firefighting and fire prevention of structures, the collected data is recorded at least one or more of unencrypted, encrypted, encrypted with blockchain, and encrypted with biometrics, the recorded data disposed for at least a period on the at least one computer processor and memory and operationally accessible by at least one networked computerized device.

In one embodiment of the system for firefighting and fire prevention of structures, the data is processed by machine learning to facilitate situation assessment, decision making, and taking actions, the decisions and actions taken at least one or more of manually, automatically, and autonomously.

In one embodiment of the system for firefighting and fire prevention of structures, the at least one user interface presents at least one or more of a two-dimensional schematic image, a three-dimensional schematic image, a photographic image, a three-dimensional virtual image, a holographic image, a projected image, and combinations of the images, the images designed to illustrate the places and at least one or more of the tools to at least one or more of the users.

In one embodiment of the system for firefighting and fire prevention of structures, the data is structured by at least one or more of system type, system scope, system ownership, system responsibility, system user, system service schedule, system service provider, system cluster, and related systems, the related systems which may further be cross matrixed by at least one or more of type, scope, ownership, responsibility, user, service schedule, service provider, cluster, and related systems, the related systems which may further be at least one or more of a supersystem, a subsystem, and a complementing system.

In one embodiment of the system for firefighting and fire prevention of structures, at least one or more of the systems, supersystems, and subsystems are networked, and hardware includes at least one or more operational sensors designed to communicate data through the network about at least one or more of the operational status, environmental status, and event status of the hardware, software, vehicles, data, and associated chemicals.

In one embodiment of the system for firefighting and fire prevention of structures, the at least one user interface presents at least one or more of a two-dimensional schematic image, a three-dimensional schematic image, a photographic image, a three-dimensional virtual image, a holographic image, a projected image, and combinations of the images, the images designed to illustrate the places and at least one or more of the tools to at least one or more of the users, wherein the users may retrieve data associated with at least one system by system type, system scope, system ownership, system responsibility, system user, system service schedule, system service provider, system cluster, related systems, and individual units.

In one embodiment of the system for firefighting and fire prevention of structures, the states and the changes in the states of the users, places, and tools from which to assess situations, facilitate decisions, and take actions—the decisions and actions including at least one or more from the group of: firefighting system use, firefighting system maintenance, and firefighting system replacement—are simulated.

In one embodiment of the system for firefighting and fire prevention of structures, the states and changes in the states of the users, places, and tools from which to assess situations, facilitate decision making, and take actions—the decisions and actions including at least one or more from the group of: firefighting system use, firefighting system maintenance, and firefighting system replacement—are played back.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 1-7 illustrate representative screens for viewing and editing people.

FIGS. 8-11 illustrate representative screens for viewing and editing organizations.

FIGS. 12-14 illustrate representative screens for viewing and editing properties.

FIGS. 29-30 illustrate a representative proposal.

FIG. 40A-E illustrates a representative method of using the system for firefighting and fire prevention of structures.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

FIG. 1-36 illustrate the inventive concept supportive of improvements illustrated in FIG. 37-40A-E. Improvements further the use of the inventive concept as a decision support tool for assuring readiness of supported firefighting tools and the application of those tools during an emergency.

Figure 33:
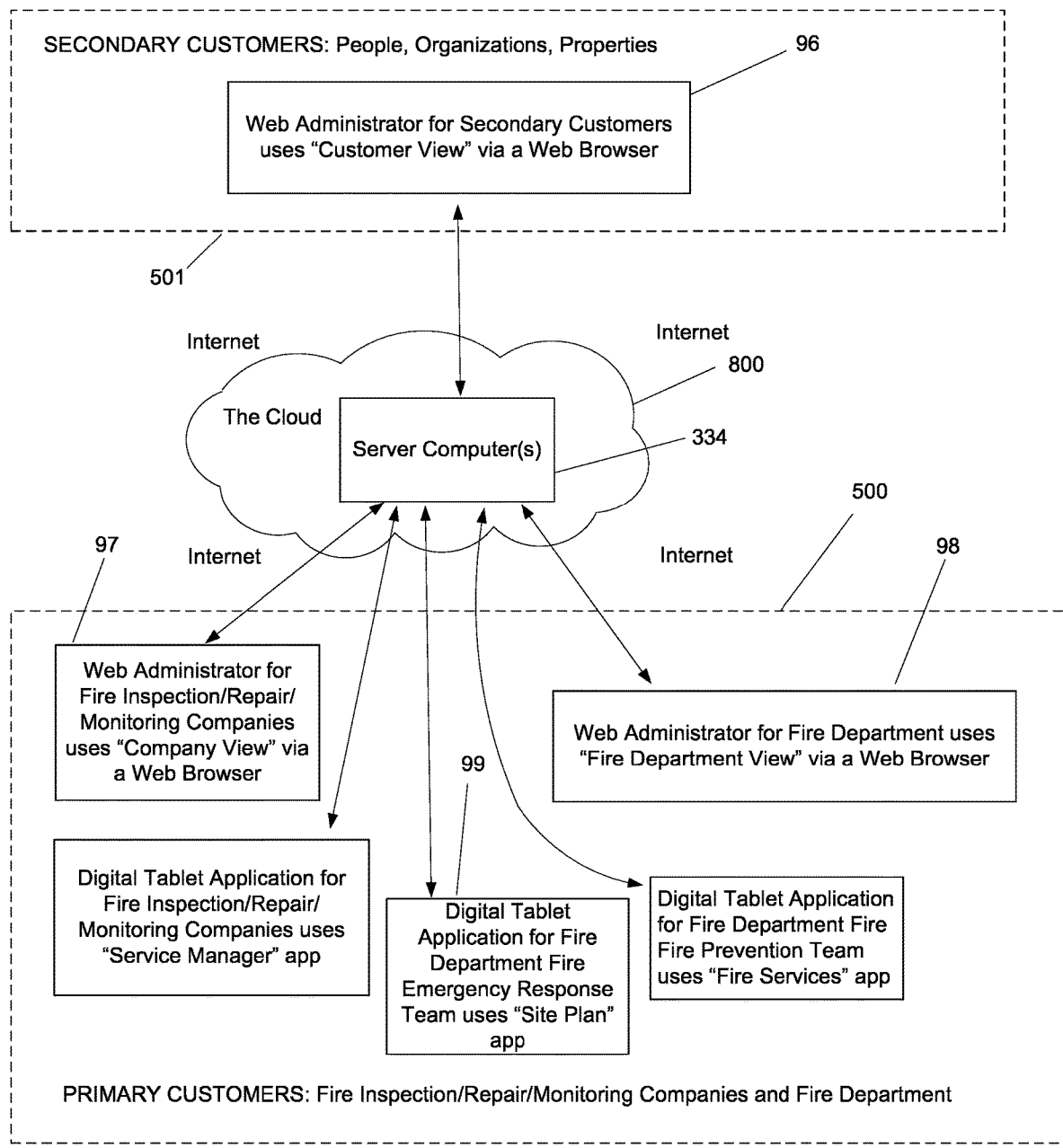
FIG. 33 illustrates representative connectivity.
Figure 34:
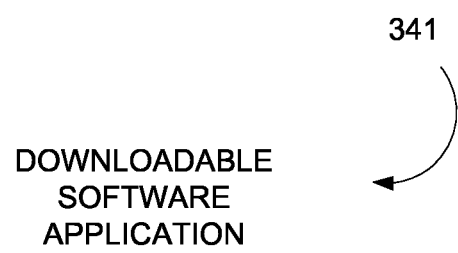
FIG. 34 illustrates a representative software application.
Figure 35A:
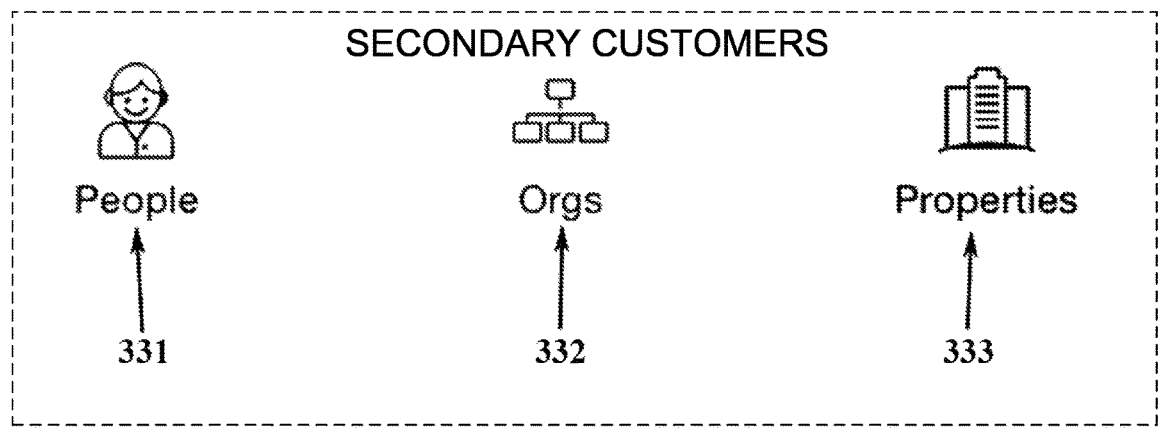
FIGS. 35A-35B illustrate representative secondary customers and primary customers.
Figure 35B:
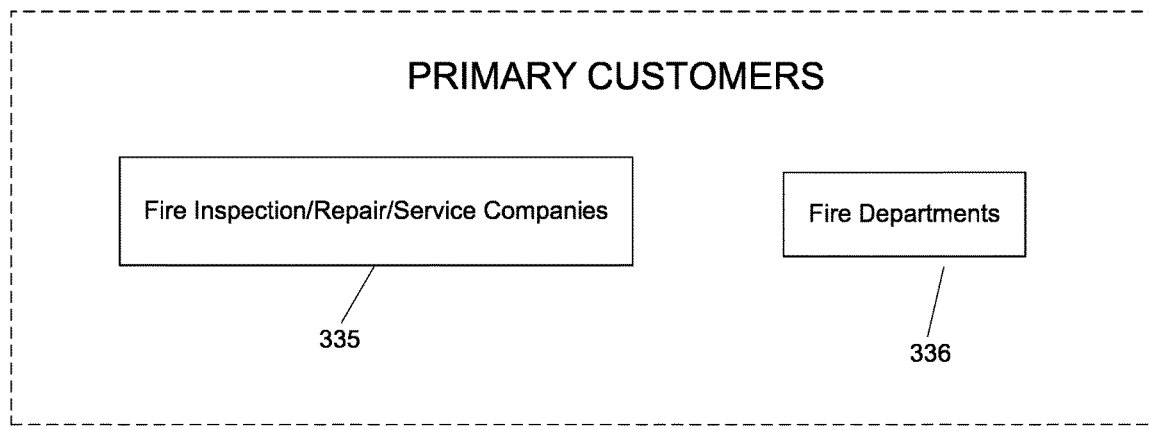
Figure 36:
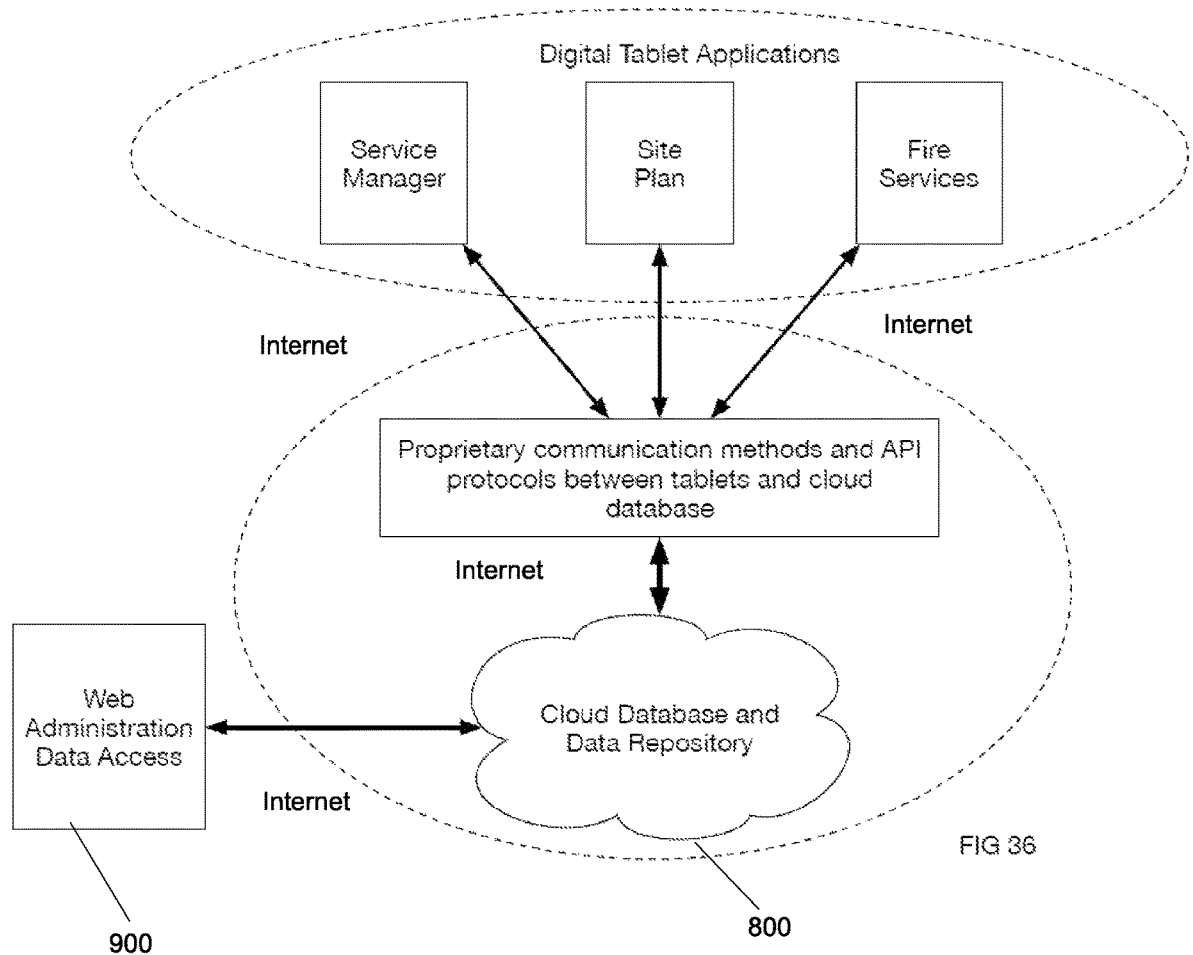
FIG. 36 illustrates representative connectivity.

FIG. 33 illustrates a block diagram illustrating representative connectivity of the present inventive concept. In a representative embodiment, information regarding secondary customers 501 is uploaded to a central cloud database 800 having server computers 334. Secondary customers 501 include people 331, organizations 332, and properties 333 (FIG. 35A). Primary customers 500 are then able to access this uploaded information. Primary customers 500 include fire inspection/repair/service companies 335 and fire departments 336 (FIG. 35B).

In one embodiment, primary customers 500 have downloaded application programming 341 (FIG. 34) via a computer network (such as the Internet). Primary customers 500 use the application to collect, store, view, and access information from central cloud database 800. Secondary customers can view via web browser information about their particular property, buildings, and safety equipment. This allows the secondary customer's computers to connect via the Internet to their relevant information regarding their specific information properties, building and allow secondary customers to view reports, budgets, and other relevant information. Connected entities may then access the uploaded information accessible on cloud server 800 and connect with each other as illustrated.

In one embodiment, software applications programming 341 is downloaded to mobile computer devices such as, but not limited to, the iPad made by Apple Computers. Other computers that are programmed utilizing app 341 include: programmable smartphones, laptop computers, desktop personal computers, and other programmable devices capable of connecting to a computer network. The app 341 allows the primary customers 500 to access listings of people, organizations and properties that have had their identifying information entered into a database on cloud server 800. A primary customer can also view maps and photographs of properties in the database. A primary customer can ascertain the location of fire equipment at the properties. Fire safety inspections can be planned, assigned, and conducted at the properties. Inspection reports and deficiency lists can be generated. Service and repair companies can view the reports and generate sales proposals for consideration by the customers. During the repair process, the service and repair companies can update the repair progress immediately as repairs are made. Likewise, the secondary customers can view the repairs as they occur. Upon completion of the repairs, the primary customer's accounting department can generate bills that are transmitted to the secondary customers.

Also, in one embodiment, fire department 336 can view properties, people, and organizations that have been uploaded to the database. In the event of a fire, the fire department can access maps that show the property of interest. The fire department will then immediately know available firefighting equipment and its exact location, its current operating condition, and the date it was last inspected. With this information, a fire marshal at the fire department can view the property and fire equipment at the property and use this information to more intelligently direct the actions of fire fighters at the scene.

More specific examples of the utilization of representative embodiments of the present inventive concept are provided below.

People: In one embodiment of the present inventive concept, information on people is gathered and associated with organizations and properties that are related to the people.

Figure 1:
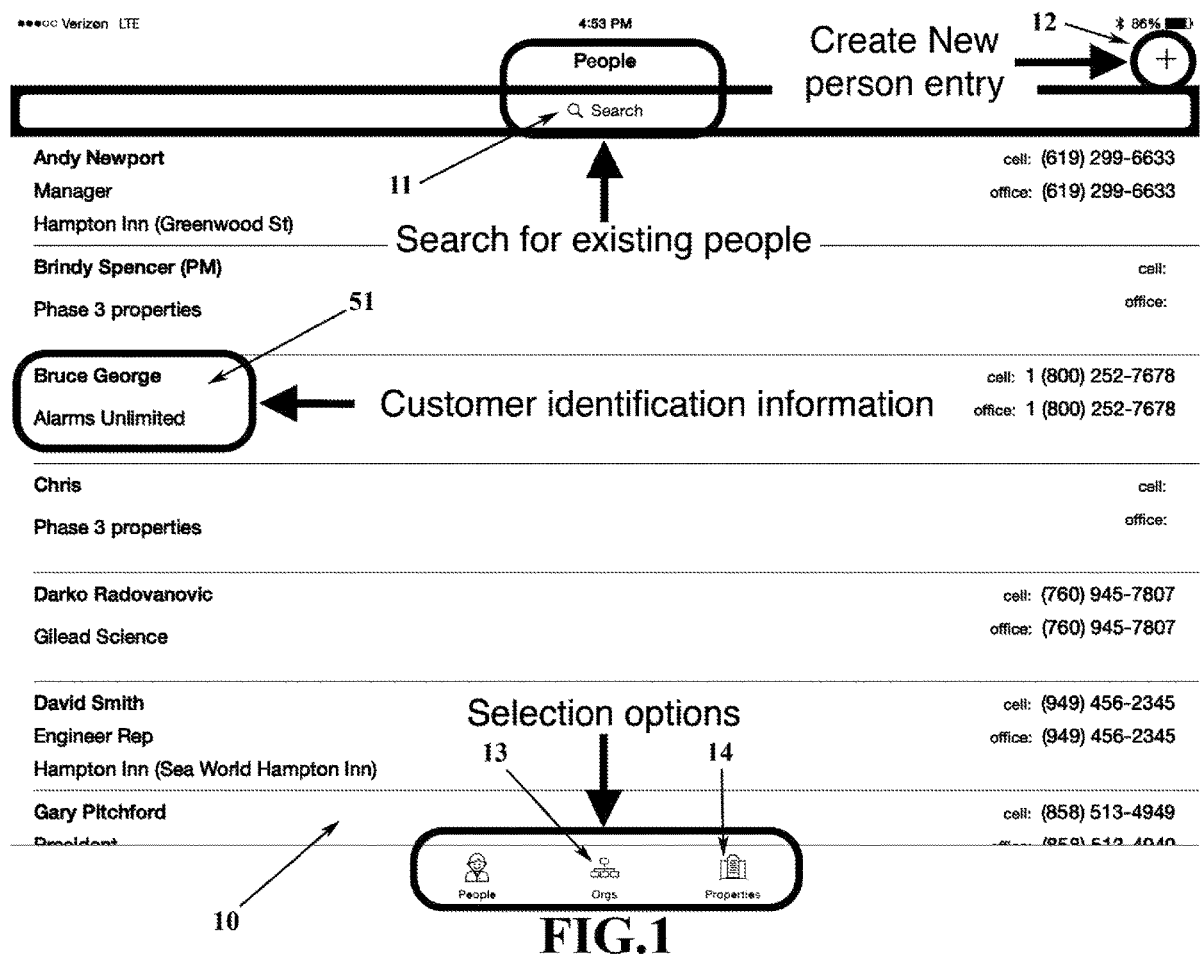
Figure 37:
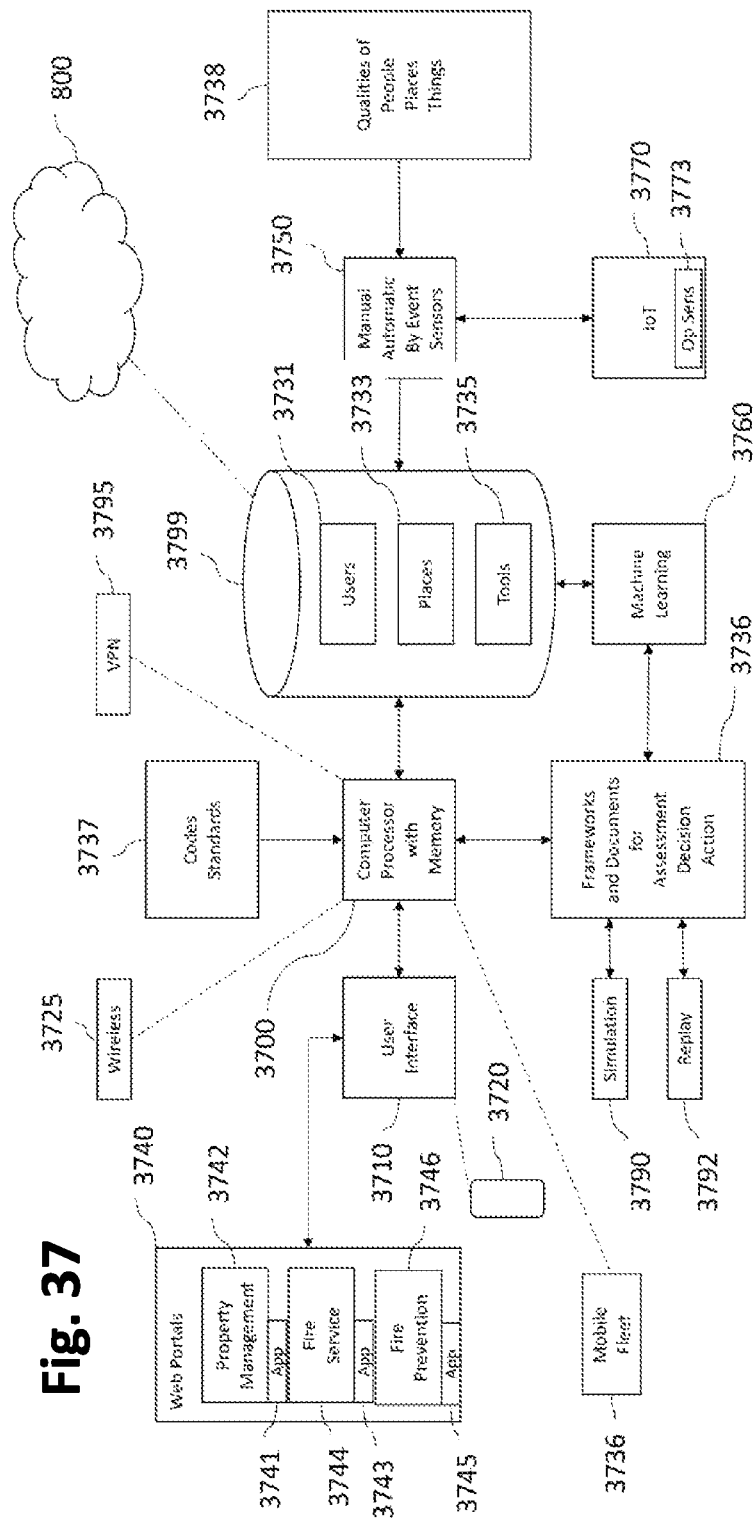
FIG. 37 illustrates the added system for firefighting and fire prevention of structures.

As illustrated in FIG. 37, the inventive concept may include the addition of an at least one user interface 3710 defined as such, the at least one user interface 3710 in some embodiments including for display aforementioned elements in FIGS. 1-36, the user interface 3710 presenting screens such as 10, 50, 60, 70, 80, 90, 91, 101, 120, 153, 154, and 155. In FIG. 1 and added FIG. 37, the user 3731 has app 341 installed on his programmable device. He has clicked on the People tab shown on the home page and has been brought to screen 10. People who have been entered into the database are listed alphabetically. From here, the user can search for a specific person by clicking on search button 11. The user can also add a new person to the database by clicking on button 12. In FIG. 1, the user is viewing the People screen 10. The user can view the Organizations screen by clicking on button 13 or he can view the Properties screen by clicking on button 14.

Figure 3:

In FIG. 2 the user has scrolled down to person "Sean Capps". To access more information on Sean Capps, the user taps on identification box 21. In FIG. 3 the user has clicked on identification box 21 (FIG. 1) and more detailed information regarding Sean Capps is displayed.

Figure 4:
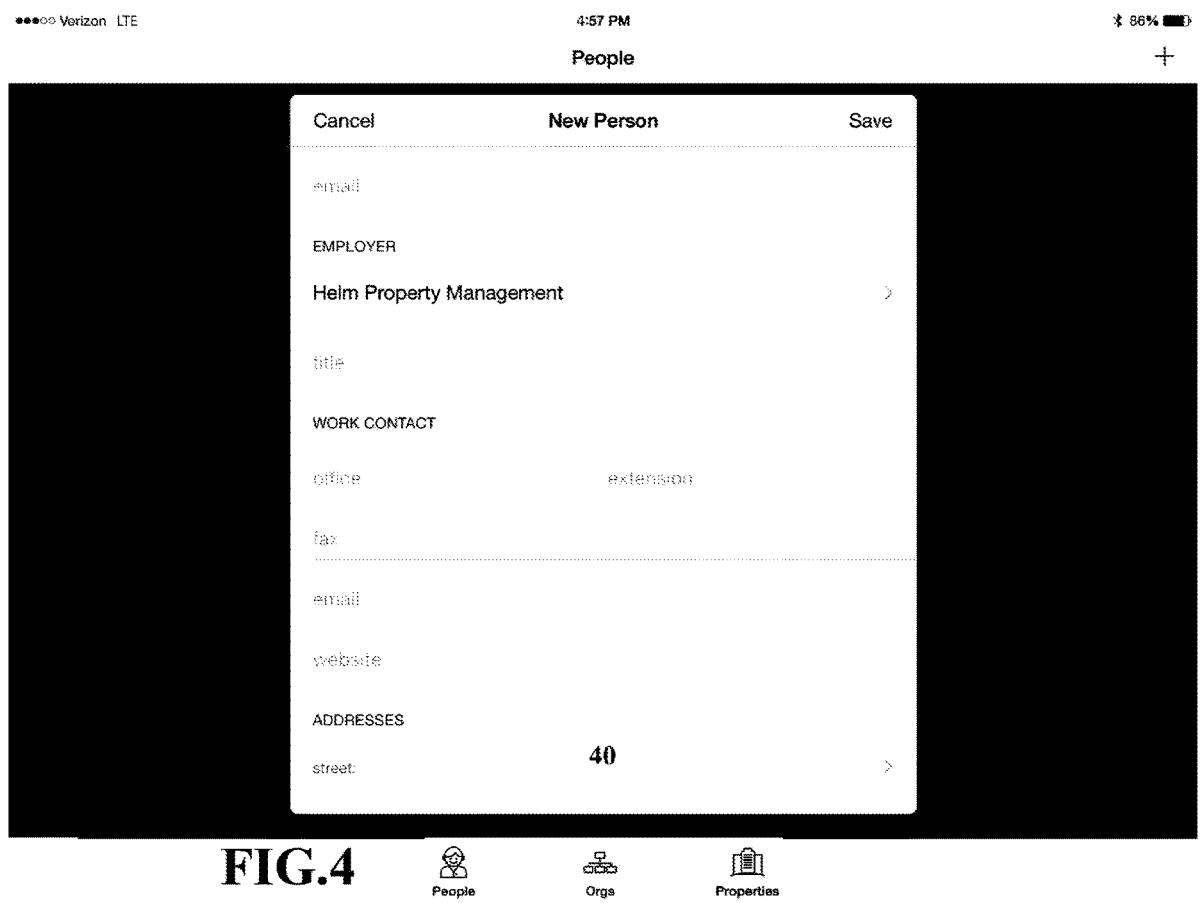

In FIG. 4, the user has clicked on button 12 (FIG. 1) to add a new person to the database and screen 40 is displayed. Information relating to the new person may be entered in the appropriate locations listed.

In FIG. 1, the user has clicked on button 51 for person "Bruce George" (FIG. 5) so that screen 50 is now displayed. The user can now edit or add more information. For example, the user can edit Bruce George information by clicking on button 52. The user can also add an employer organization for Bruce George by clicking on button 54. The user can view and access properties associated with Bruce George by viewing and clicking on section 55.

Figure 5:
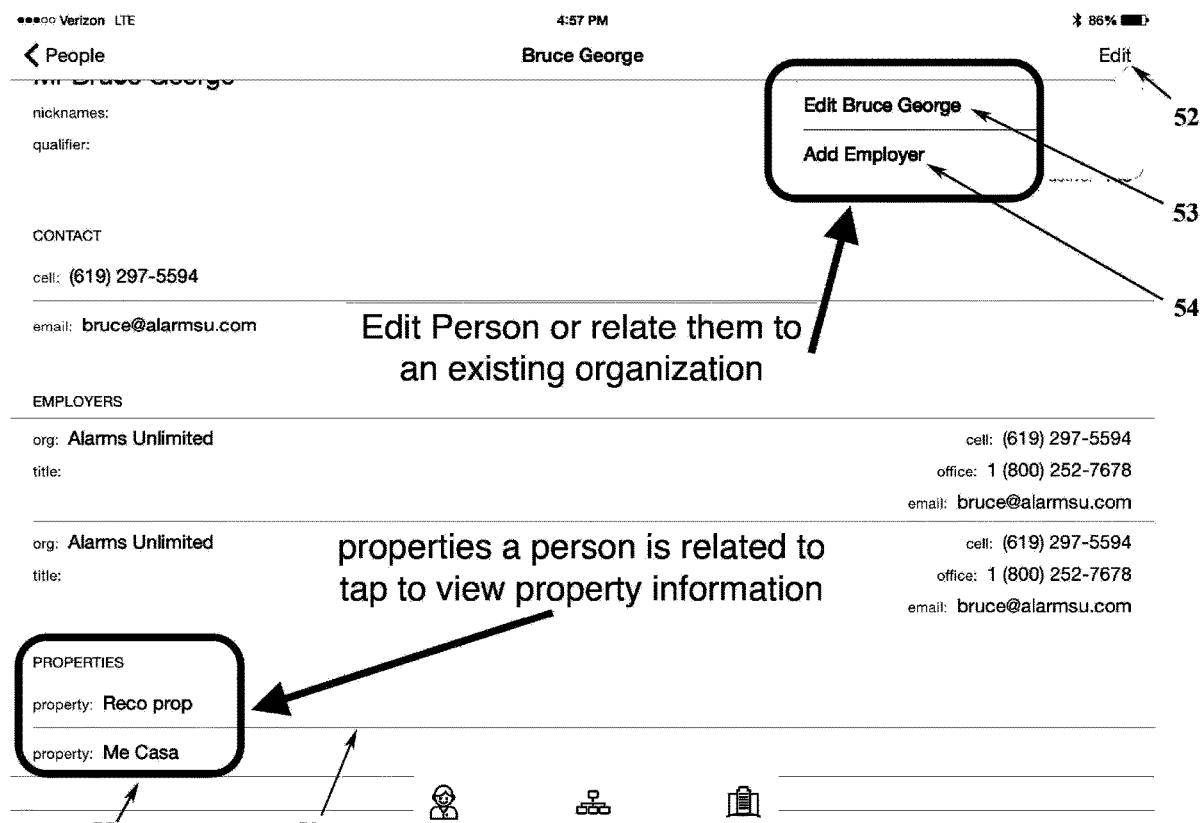
Figure 6:
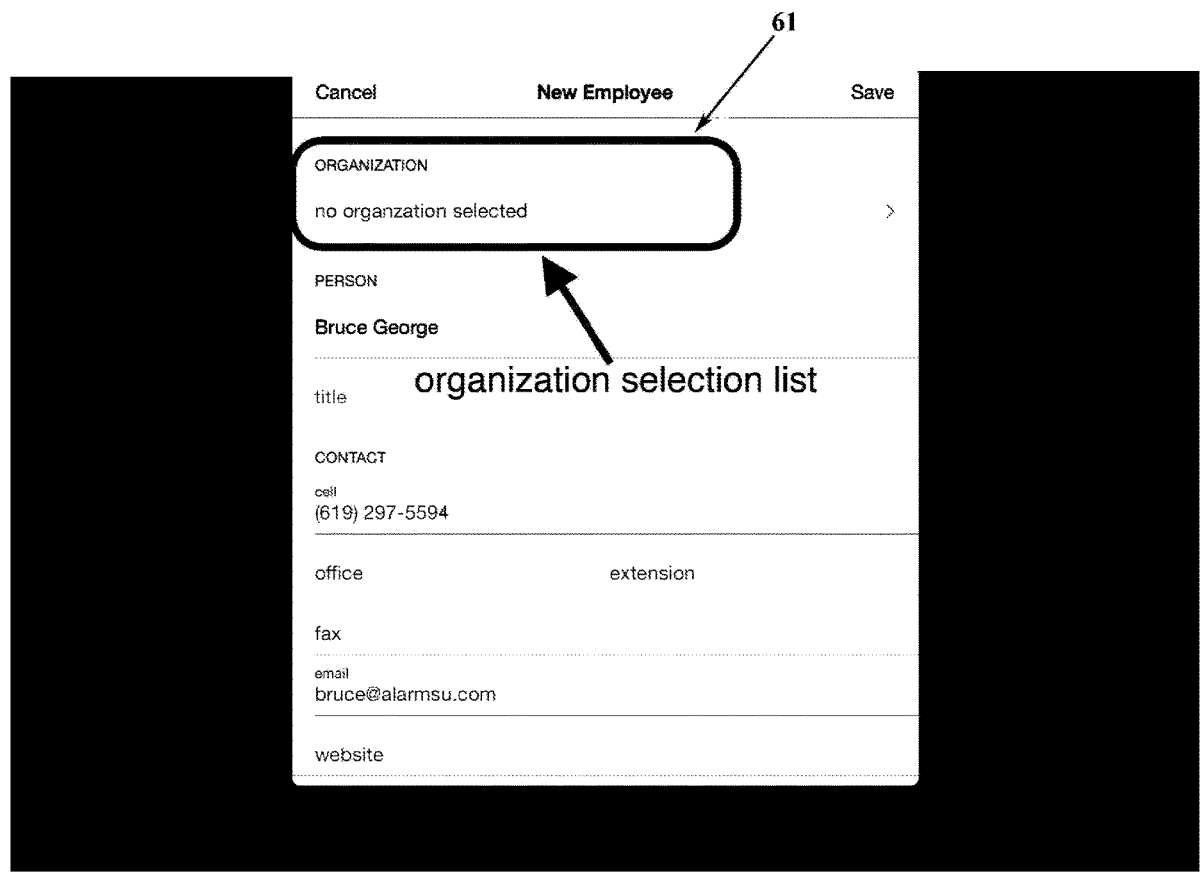
Figure 7:
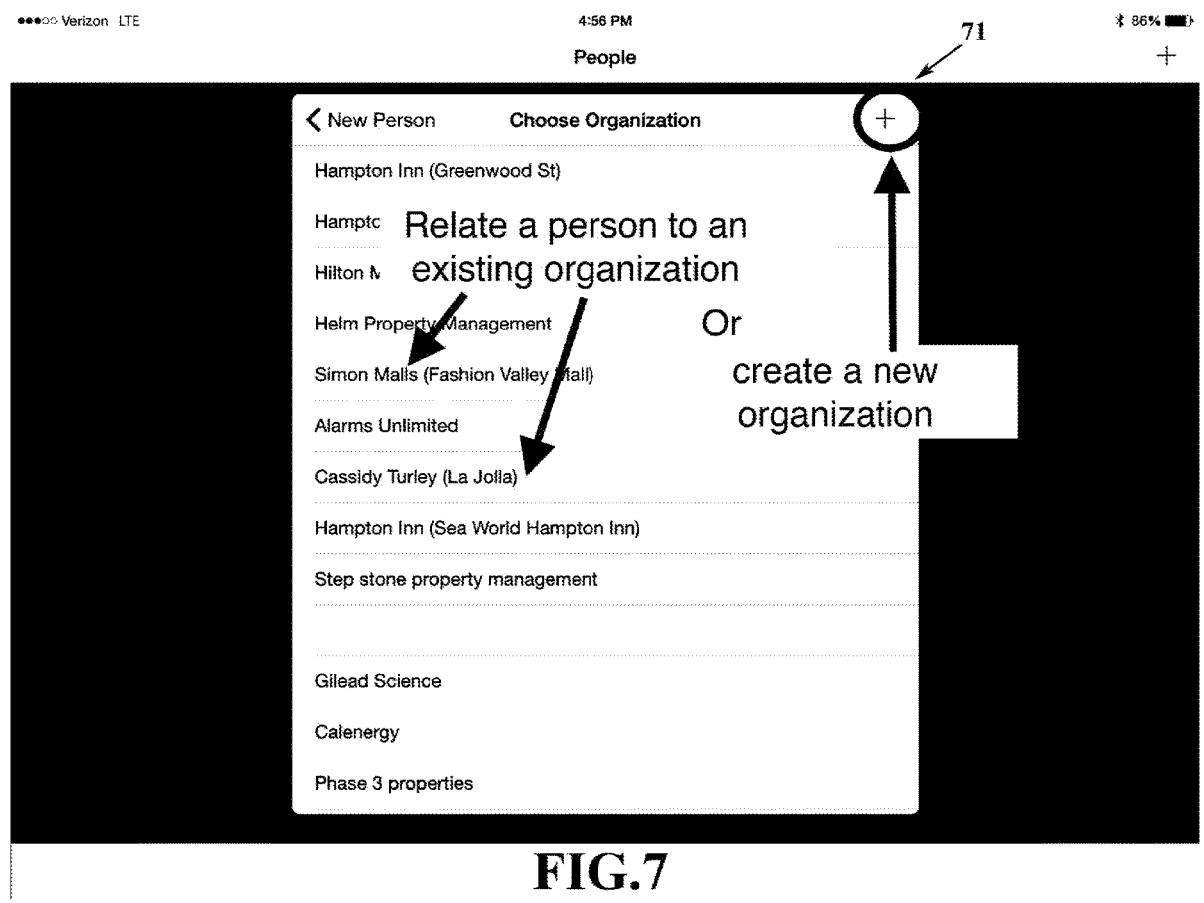
Figure 9:
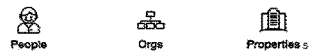

In FIG. 5, the user has clicked on button 54 to add an employer. Screen 60 (FIG. 6) is then displayed. The user then clicks on section 61 to add an organization as an employer. This brings up screen 70 shown in FIG. 7. The user can add one of the organizations shown to person "Bruce George". Or the user can add a new organization to the list by clicking on button 71.

Organizations: Organizations are also related to properties tracked in the database. For example, a property will often have associated organizations, such as: alarm companies, property managers, owners, fire departments, and on-site contacts, as well as others.

People associated with an organization, in this embodiment, are automatically listed under the organization's information and can be referenced in the organization windows. Properties associated with an organization, in this embodiment, are also listed under organizations.

In FIG. 1, the user has clicked on button 13, causing screen 80 (FIG. 8) to be displayed. Screen 80 displays a list of organizations compiled within the database listed alphabetically. In FIG. 8, the user has clicked on section 81 for the organization "One More LLC" to access more detailed information regarding One More LLC.

Screen 91 (FIG. 9) is then displayed. Here the user can view pertinent information regarding this organization. (i.e., contact information, employee lists, management, property listing, fire department, other).

Figure 10:
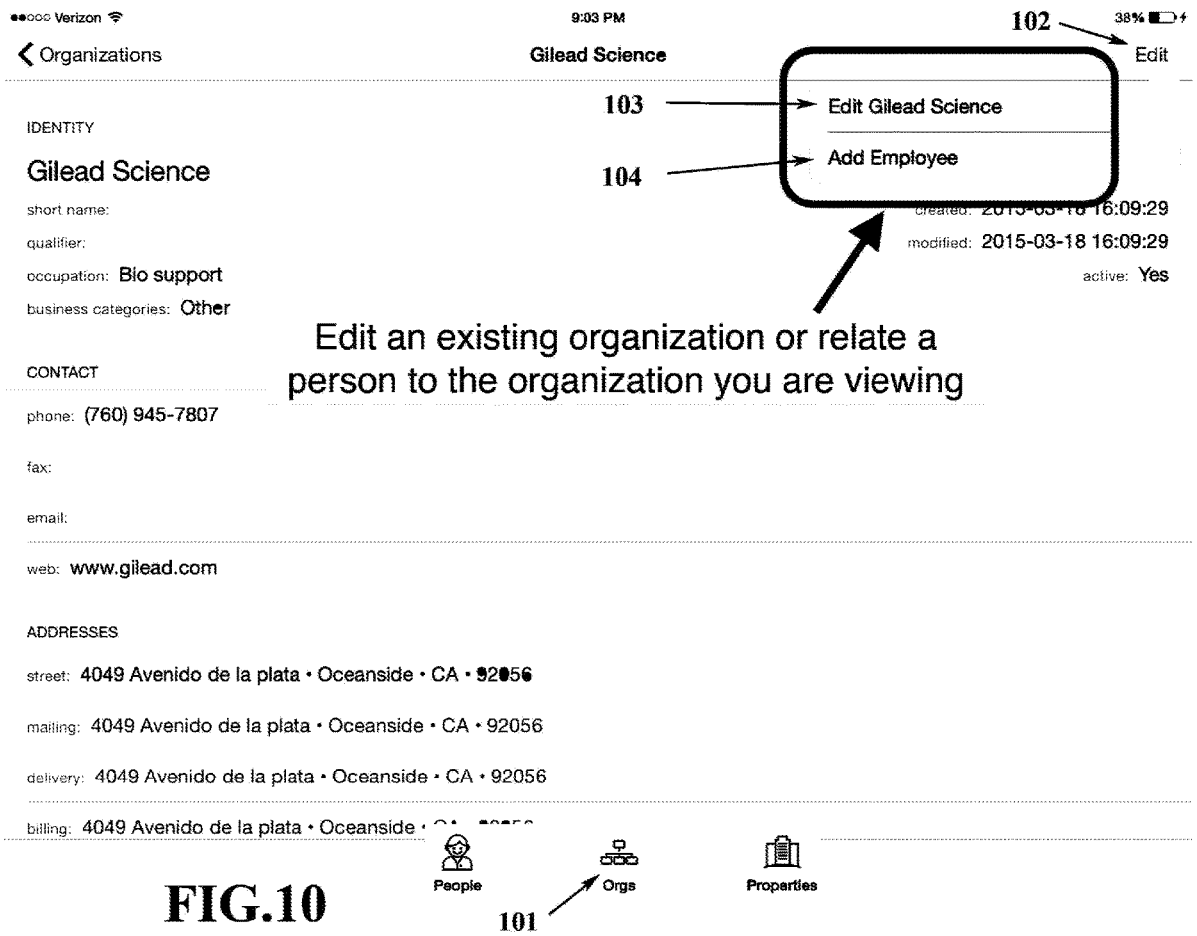

In FIG. 8, the user has clicked on section 82 for Gilead Science. This brings up the screen 101 (FIG. 10). Here the user may click on button 102 to either further edit the information for Gilead Science by clicking on button 103 or he may click on button 104 to add another employee for Gilead Science.

Figure 11:
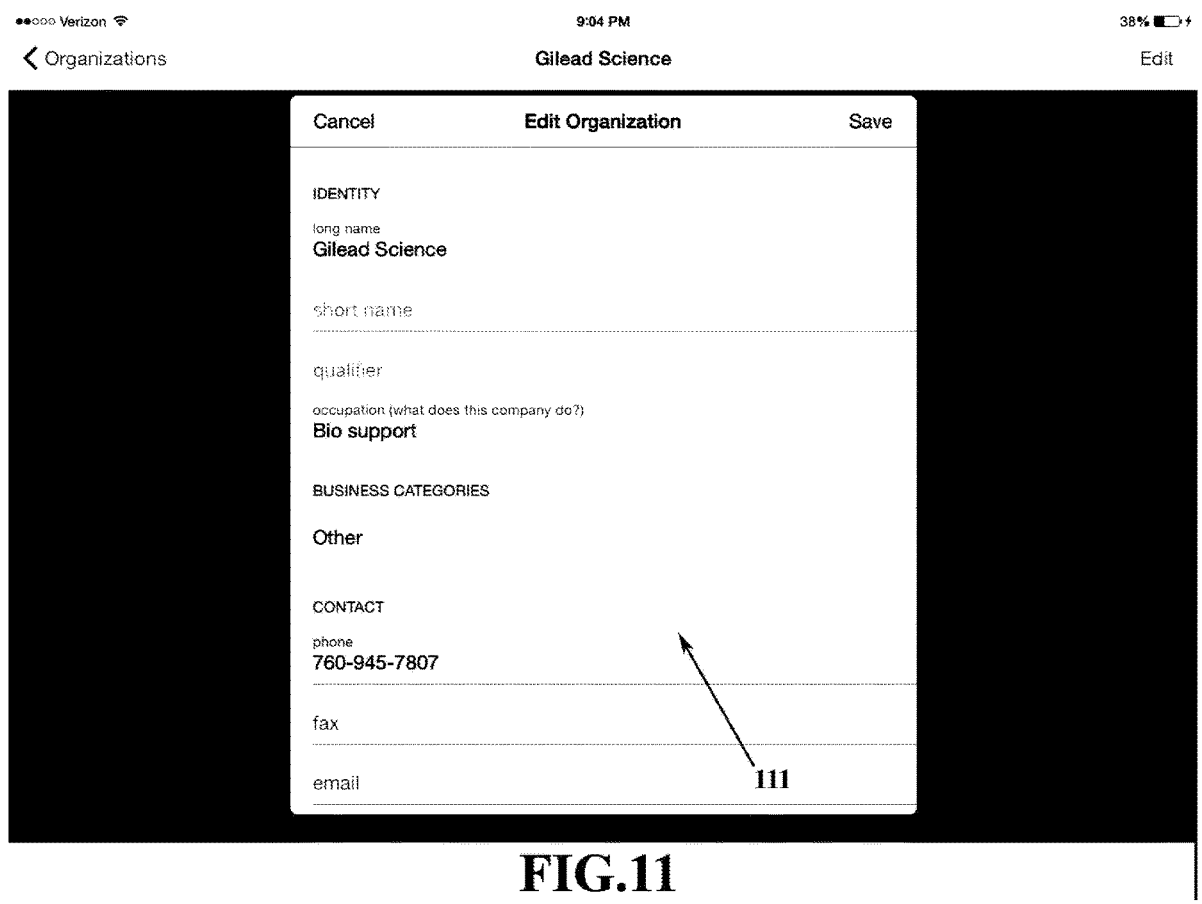
Figure 13:
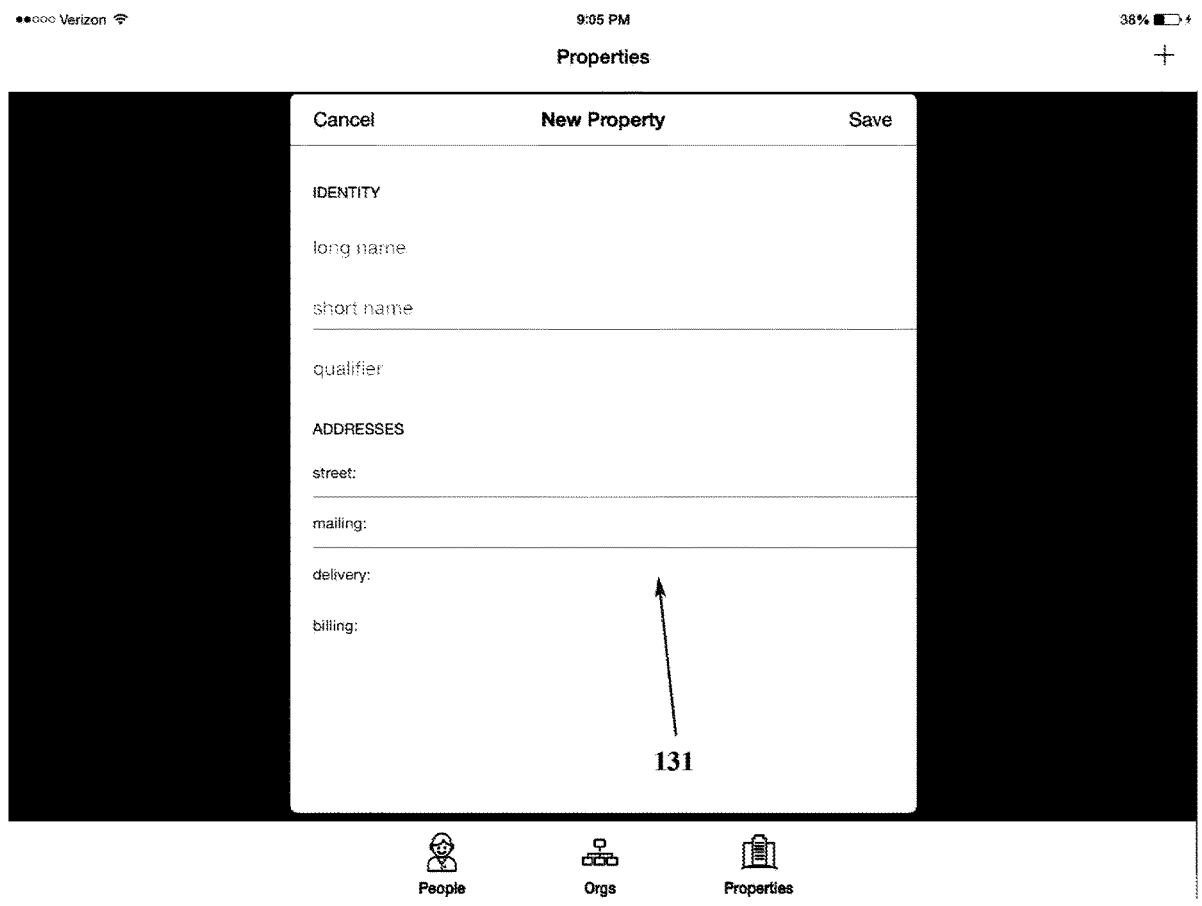

In FIG. 11, the user has clicked on button 102 (FIG. 10) to display pop-up section 111. Here the user can enter additional details regarding Gilead Science.

Properties: Properties, in this representative embodiment, are searchable by address, name, job number, building number, and through associations with people or organizations. Properties show lists of associated people and organizations involved with the properties. The lists identify the associations with the properties.

Property levels are mapped via GPS and satellite images, represented by an icon, showing exact locations of fire safety equipment both on the property level and floor levels.

Larger properties with multiple buildings sharing one individual address (such as hotels, college campuses, etc.) have extra identifiers (pins) that can be labeled accordingly and set at specific GPS locations. The building list shows at the property level, allowing the user to quickly find buildings and fire safety equipment for that building.

In FIG. 1, the user has clicked on button 14, causing screen 120 (FIG. 12) to be displayed. Screen 120 displays a list of properties compiled within the database listed alphabetically. In FIG. 12, the user has clicked on section 121 to add a new property, causing pop-up screen 131 (FIG. 13) to be displayed. Here the user may enter detailed information regarding the new property.

Figure 14:
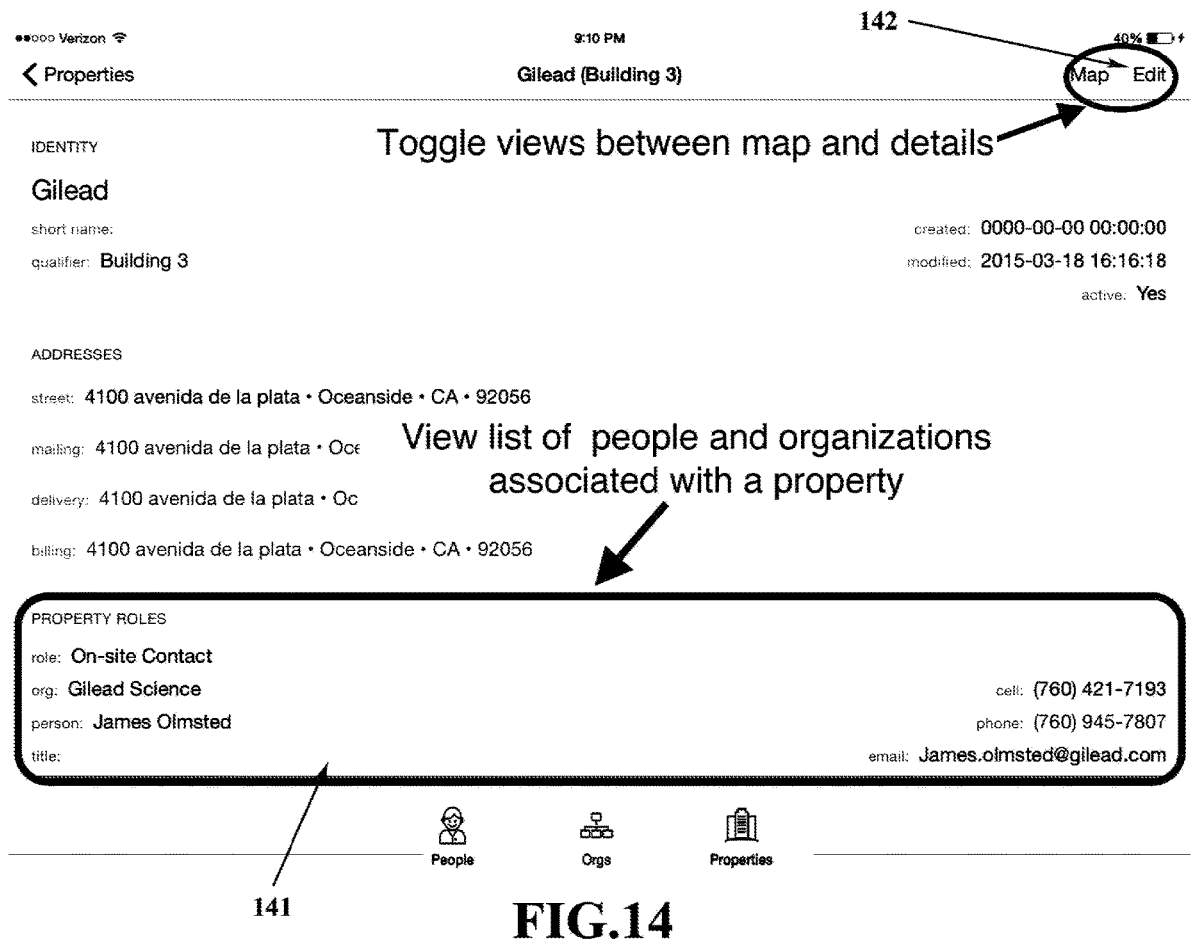

In FIG. 14 the user has selected the property Gilead from the list of properties shown in FIG. 12. More detailed information can be viewed in section 141 and edited by clicking on button 142.

Figure 15:
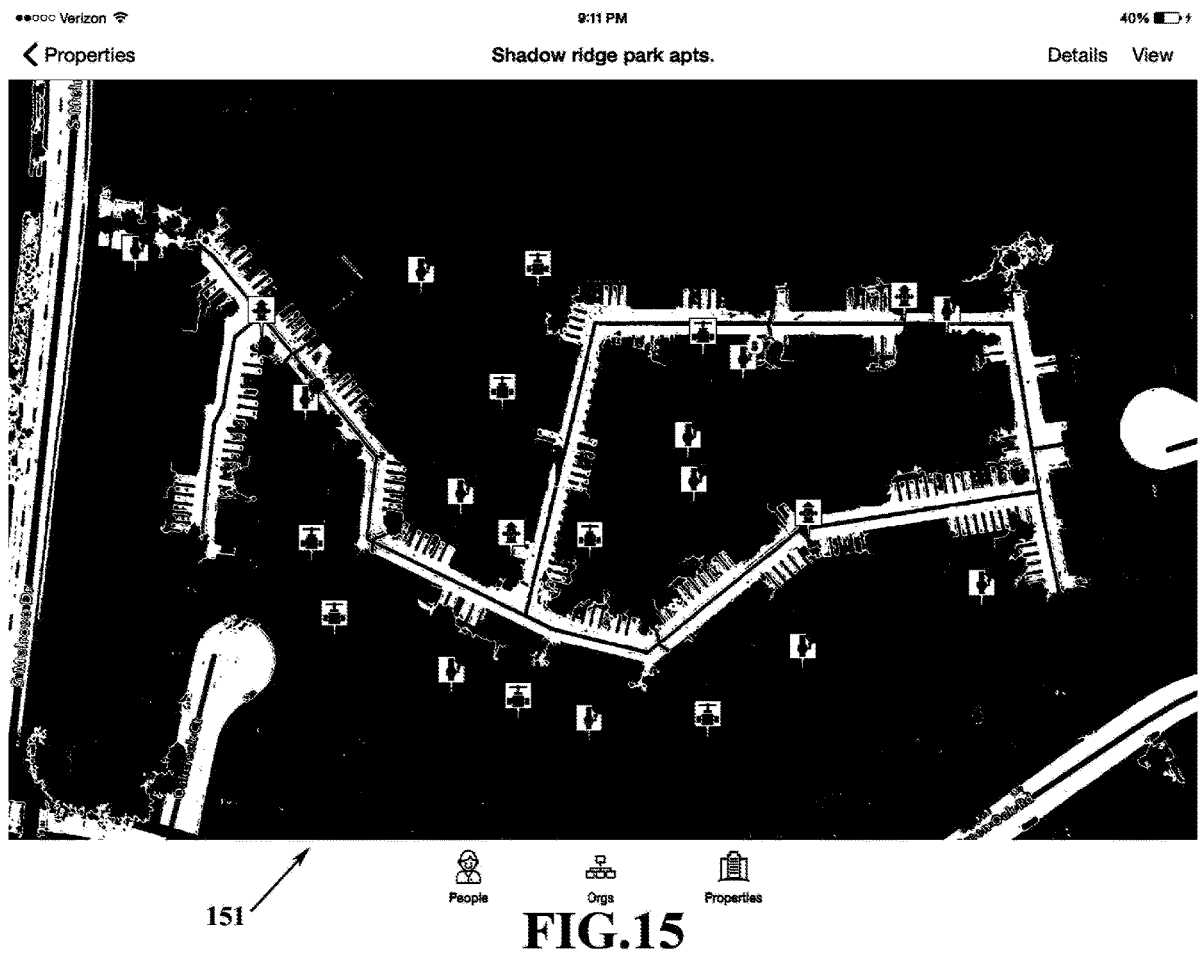
FIGS. 15-24 illustrate representative screens for mapping.

Mapping: In FIG. 15, the user has clicked on the Shadow Ridge Park Apartments icon after scrolling down the property list shown in FIG. 12. FIG. 15 depicts aerial photographic image 151 of Shadow Ridge Park Apartments. Icons representing fire safety equipment are superimposed on top of image 151. The user can click on any icon to learn more about the safety equipment represented.

Figure 16:
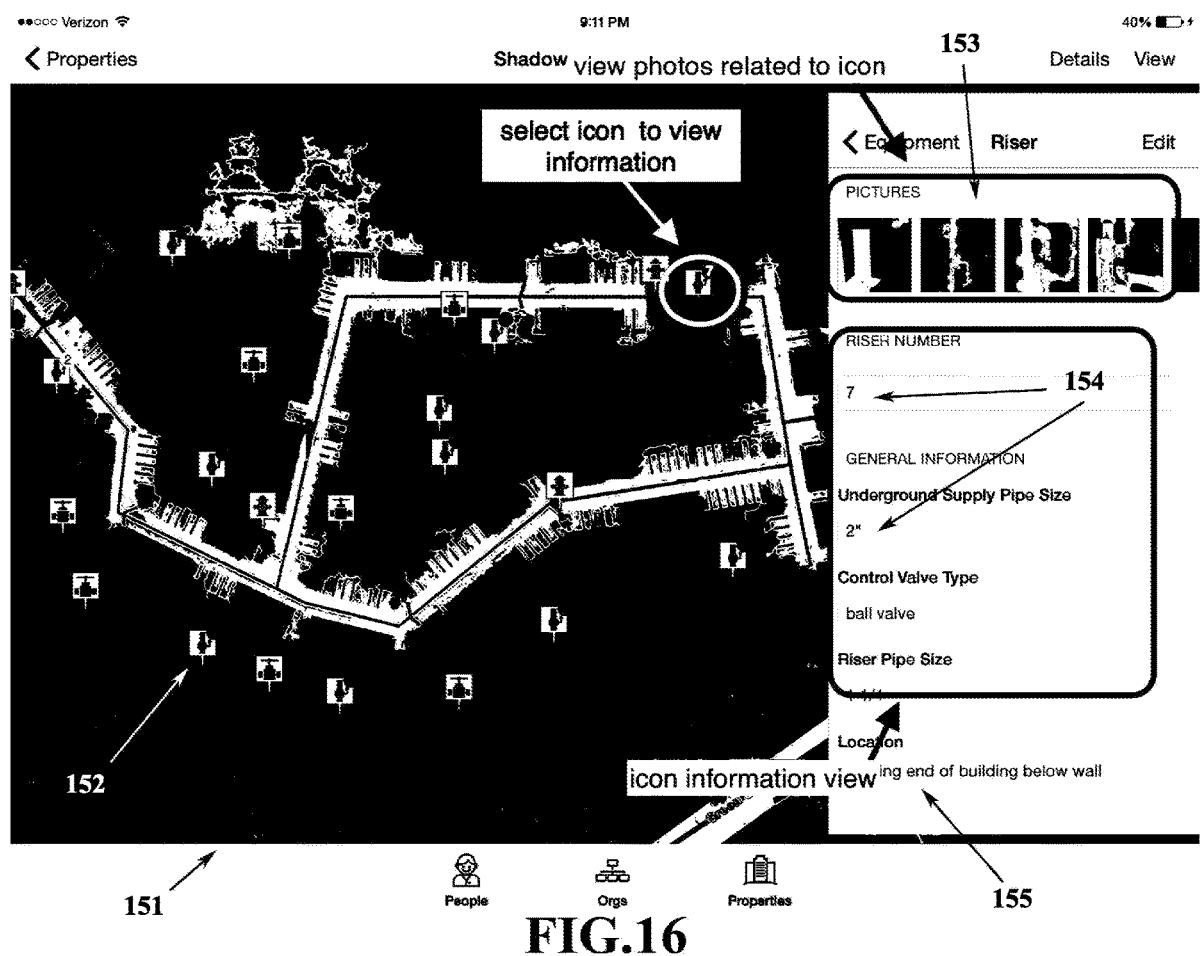

For example, in FIG. 16, the user has clicked on icon 152 depicting a riser located at the position shown on image 151. Photographs showing the riser are then depicted at pop-up screen 153, descriptive information regarding the riser/equipment is shown at pop-up screen 154, and location information regarding the riser is given at pop-up screen 155. In one representative embodiment, pop-up screens 154 and 155 can be consolidated to show all information regarding the risers.

Figure 17:
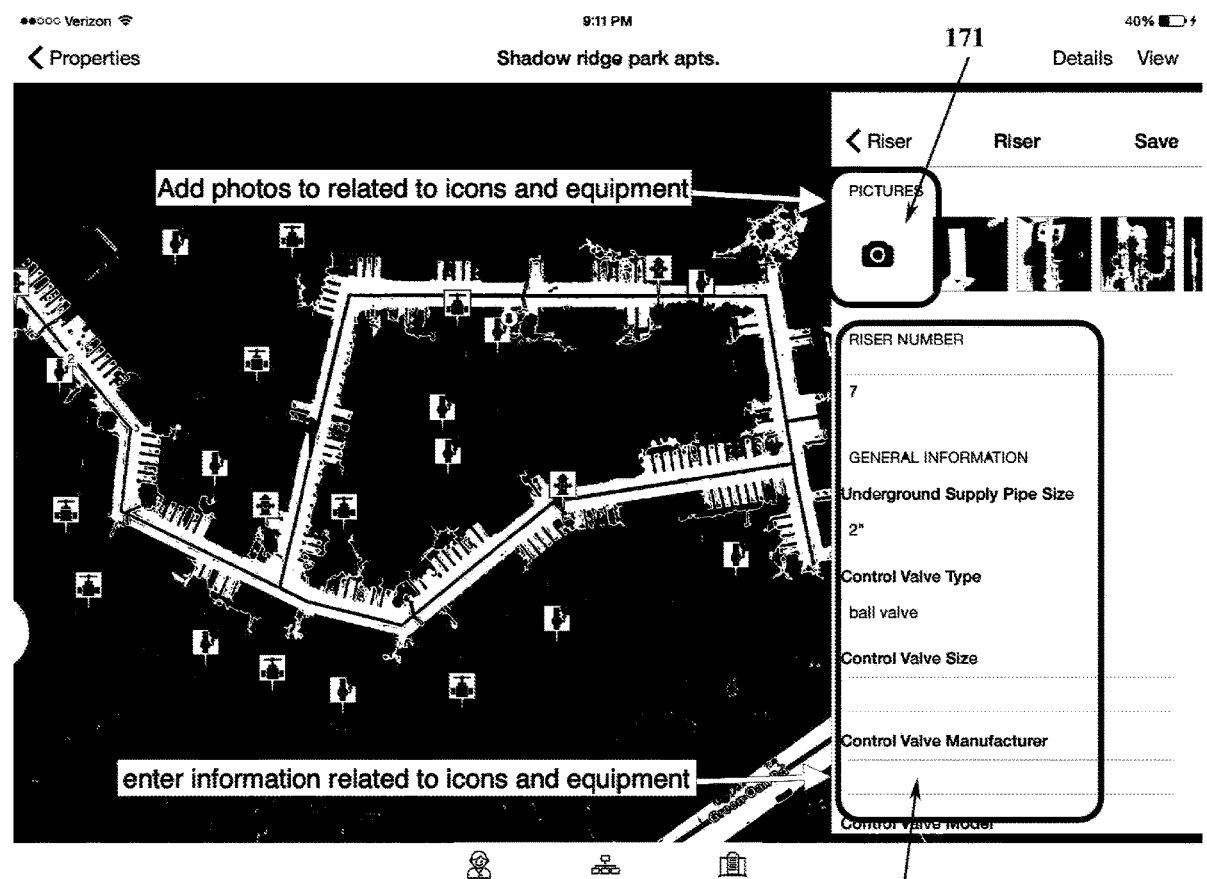
Figure 18:
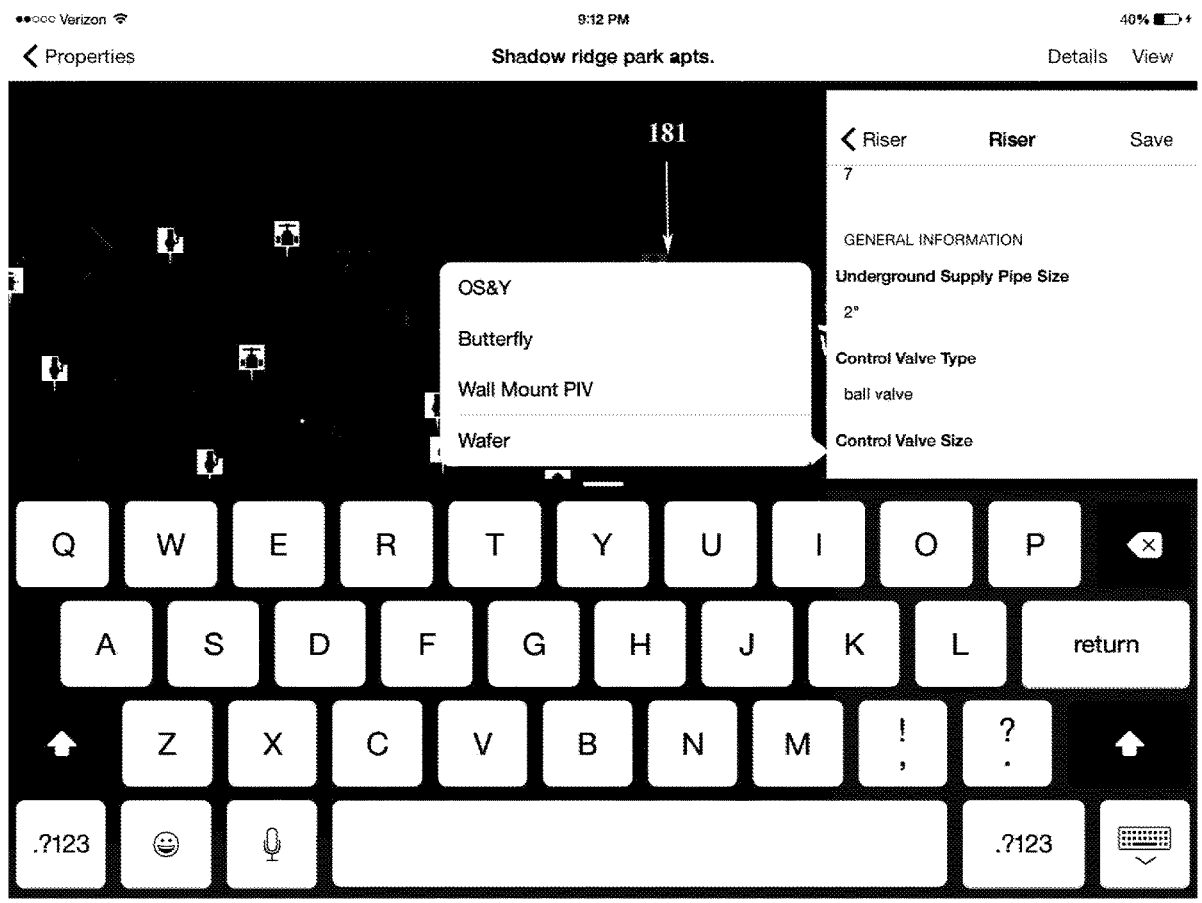
Figure 19:
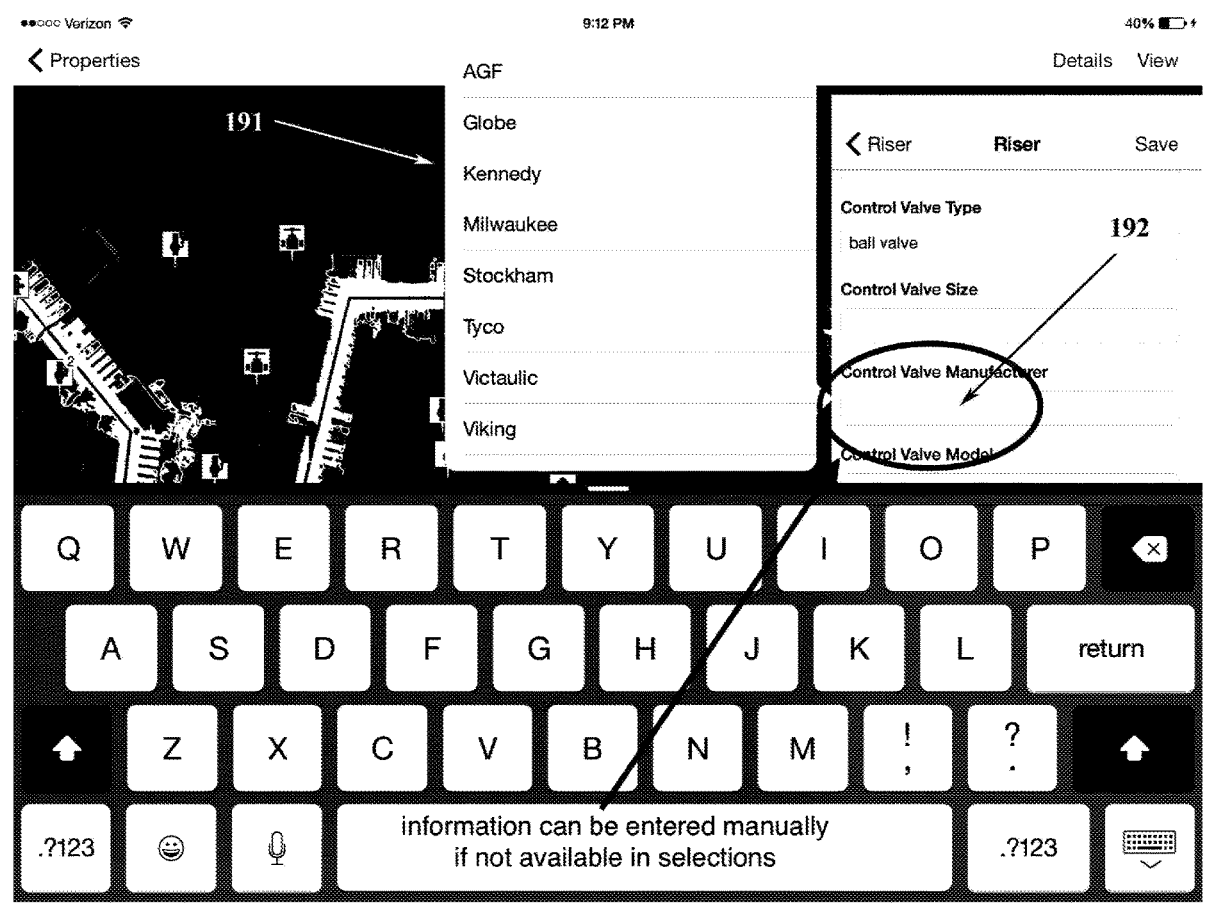

In FIG. 17, the user can click on section 171 to add additional photographs regarding the riser/equipment or he can click on section 172 to add additional information regarding the riser/equipment. For example, after clicking on section 172, pop-up selections 181 for the control valve appear as shown in FIG. 18. In FIG. 19, the additional information may be typed in manually in section 192 if selection list 191 does not include the desired information.

Figure 20:
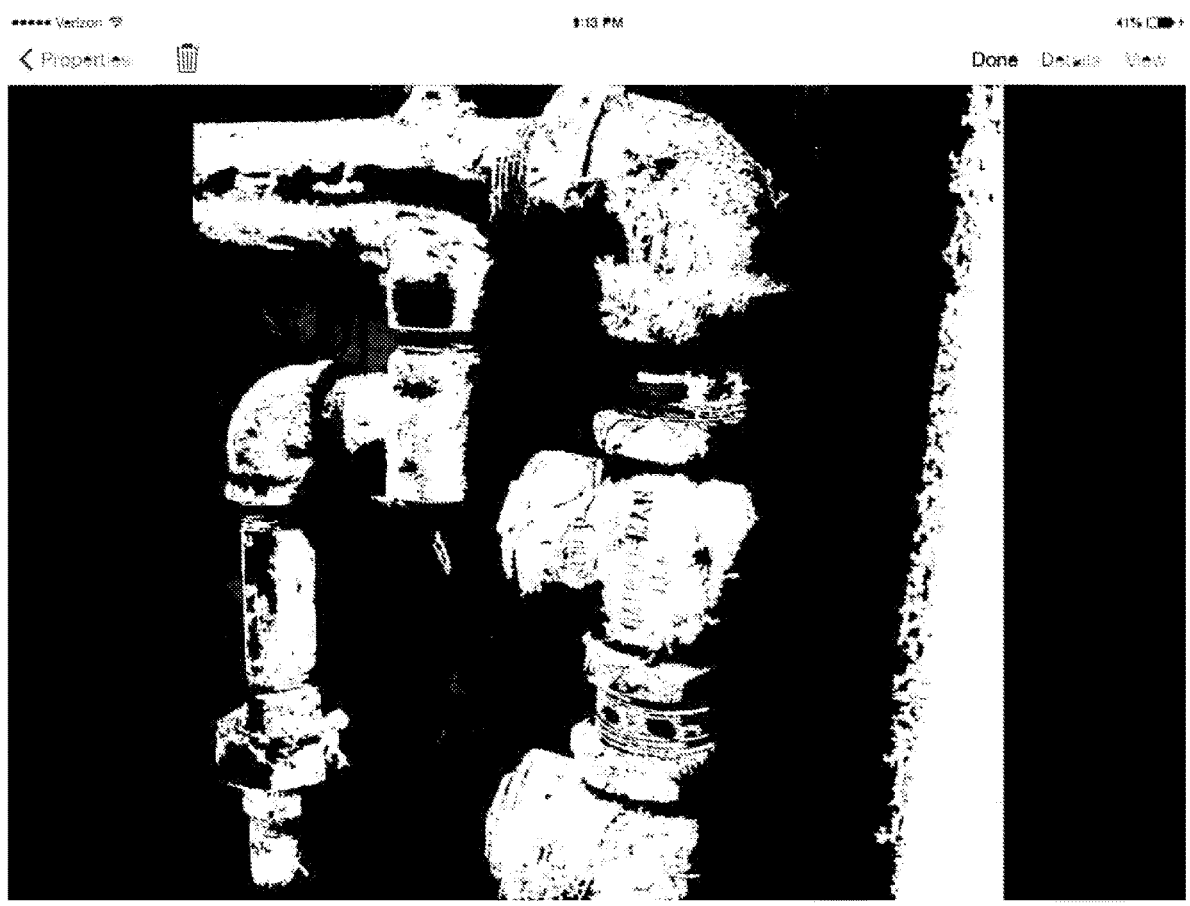
Figure 21:

FIGS. 20 and 21 depict detailed photographic images of the riser. The user may view these pictures by clicking on the desired image shown in pop-up screen 153 (FIG. 16).

Figure 22:
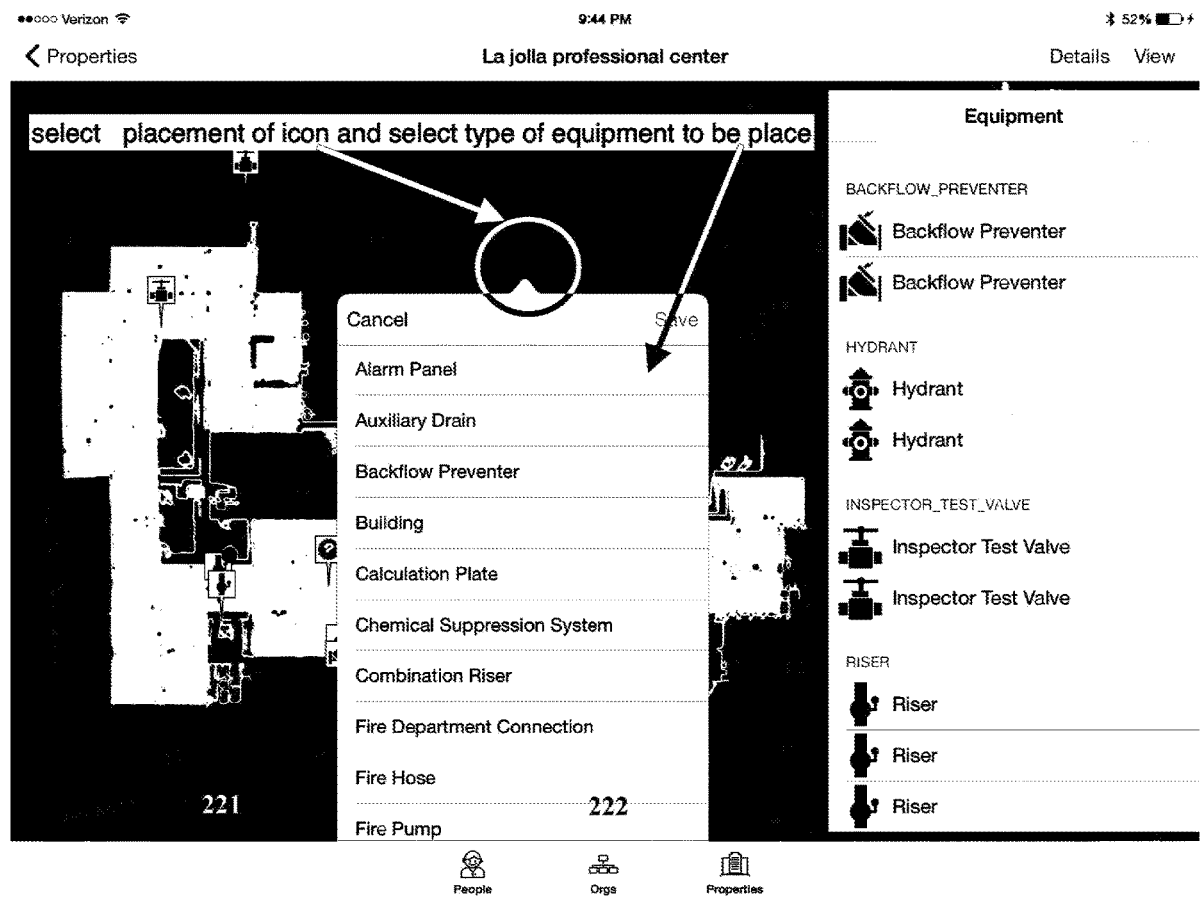
Figure 23:
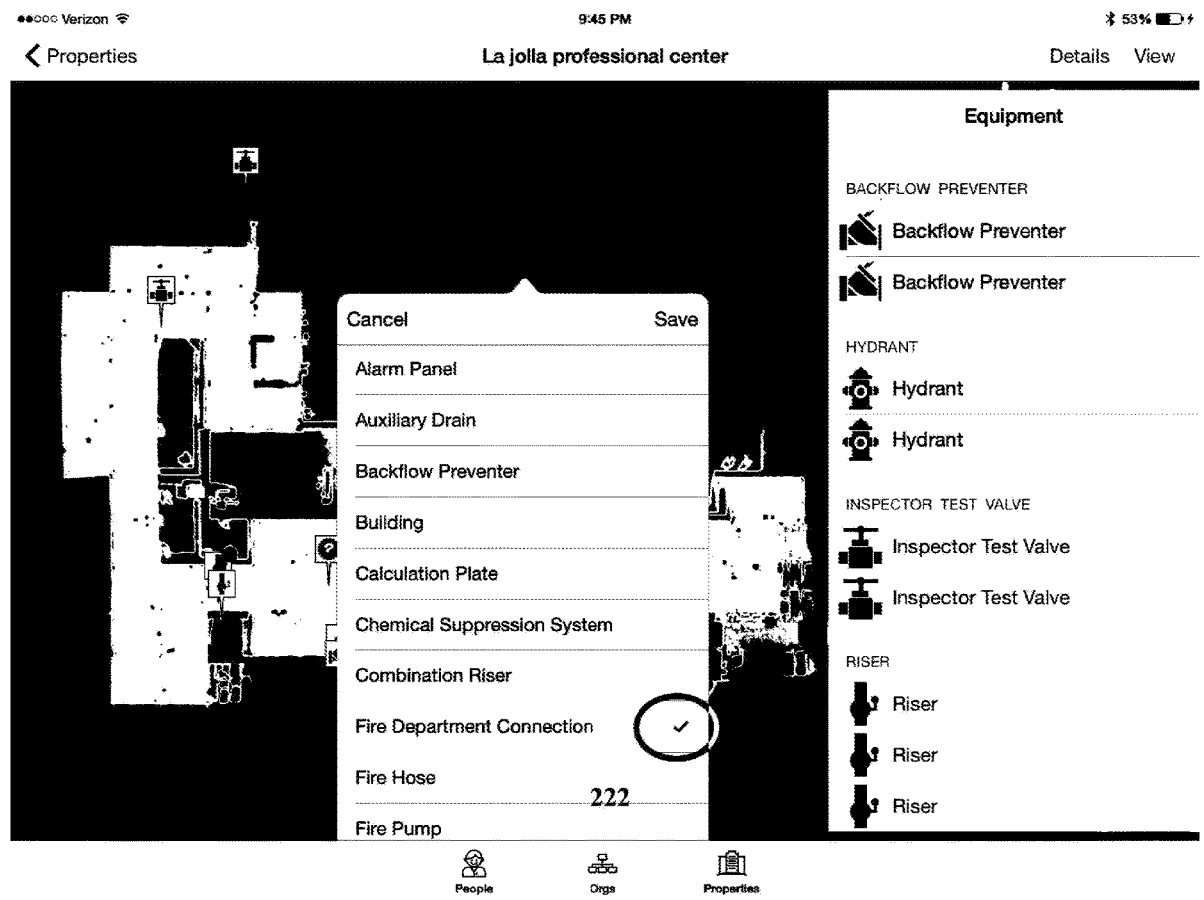
Figure 24:
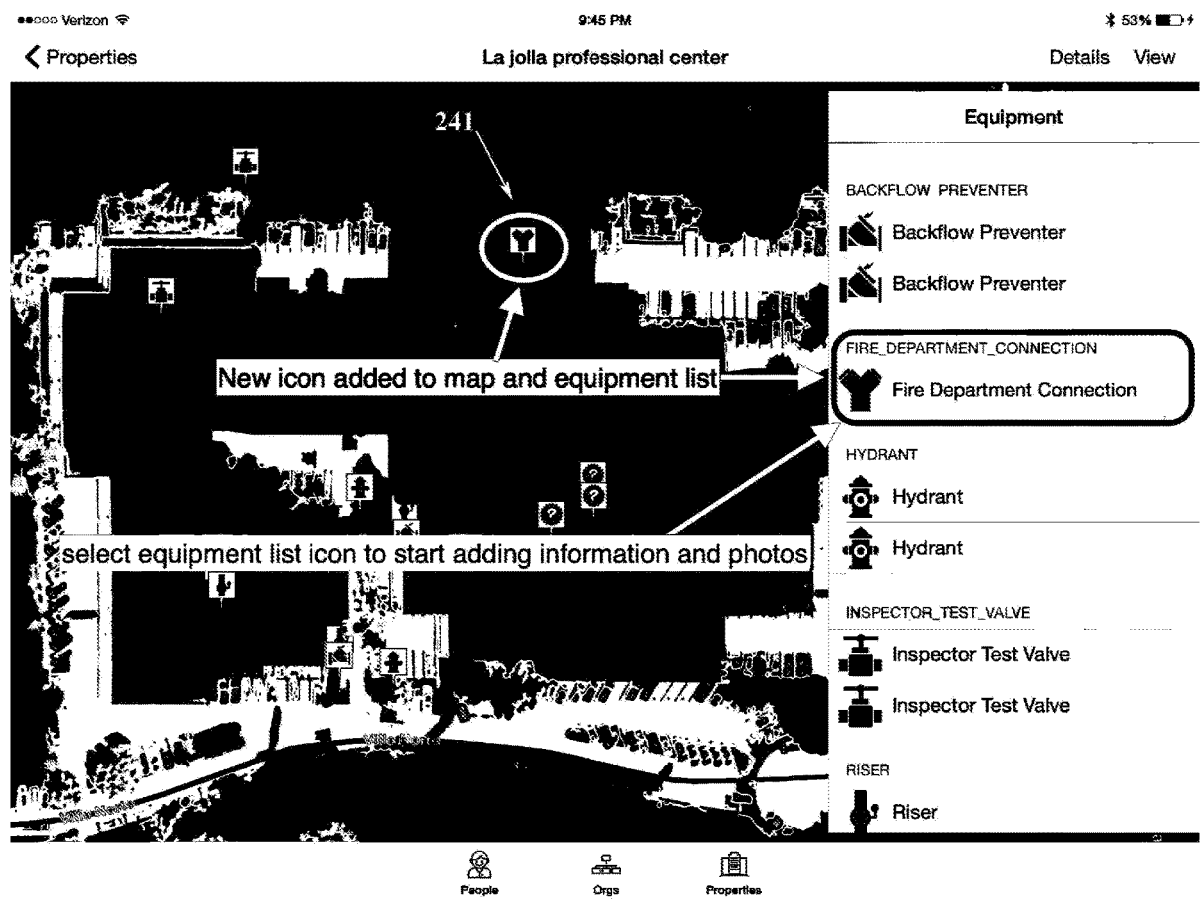
Figure 25:
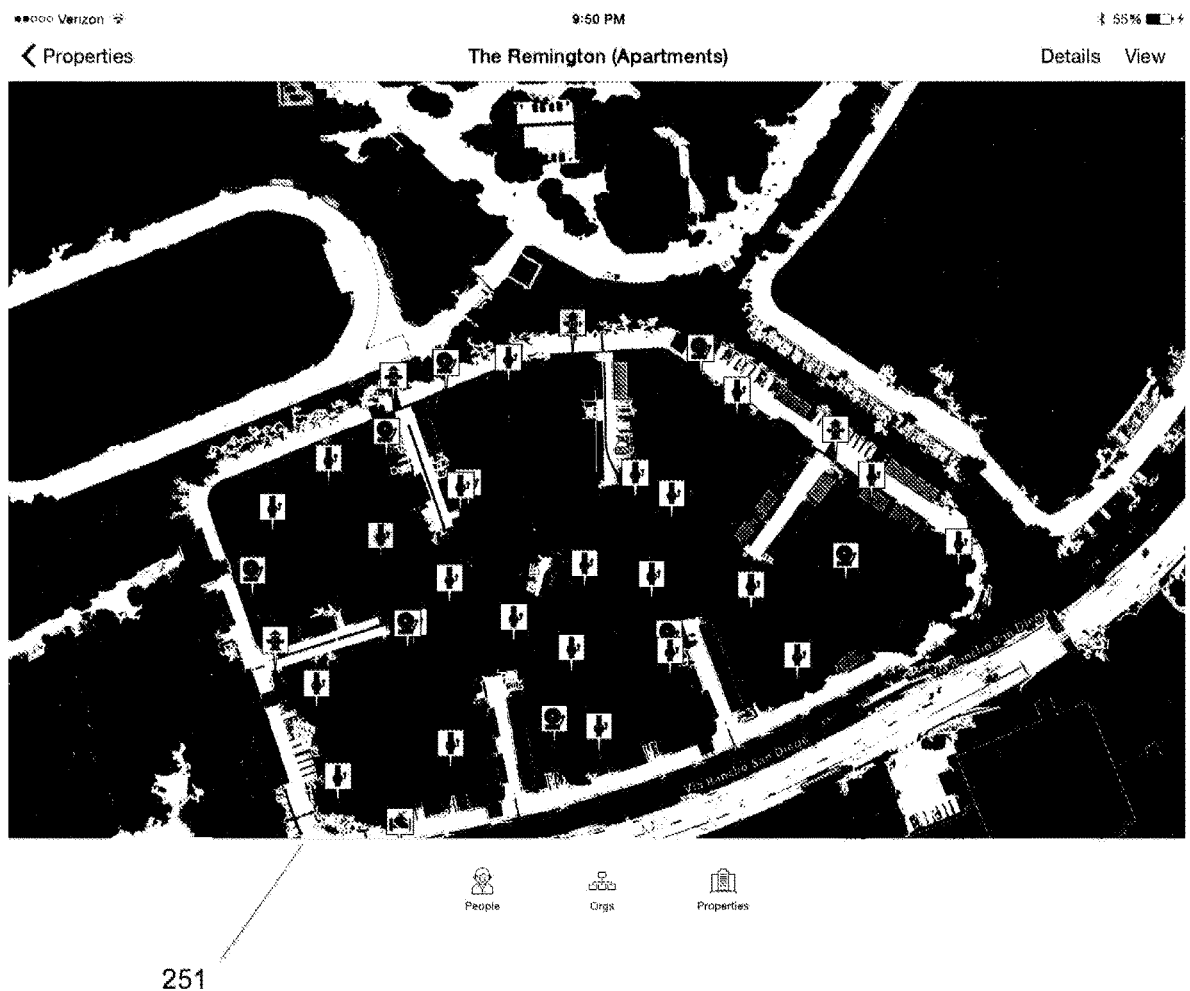
FIGS. 25-26 illustrate representative screens for fire safety inspection.
Figure 26:
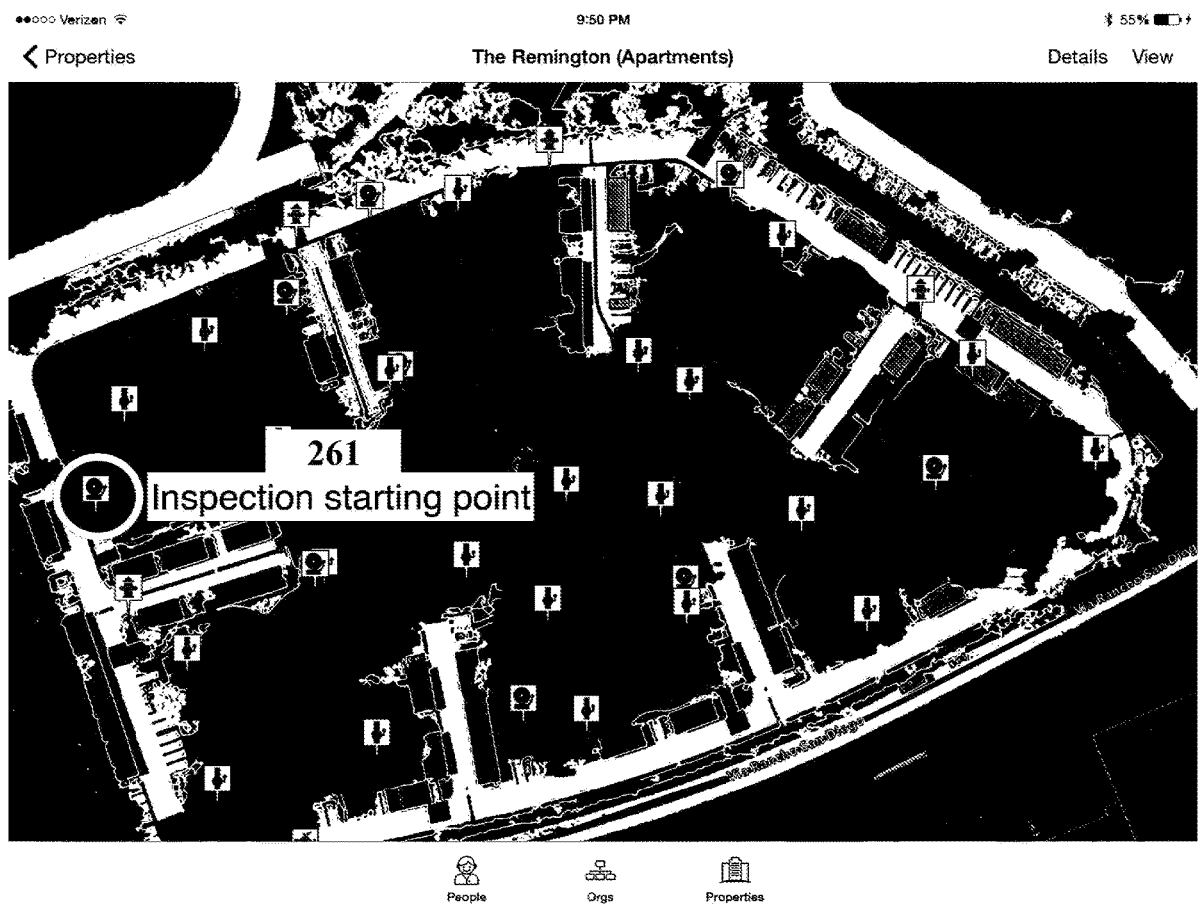
Figure 27:
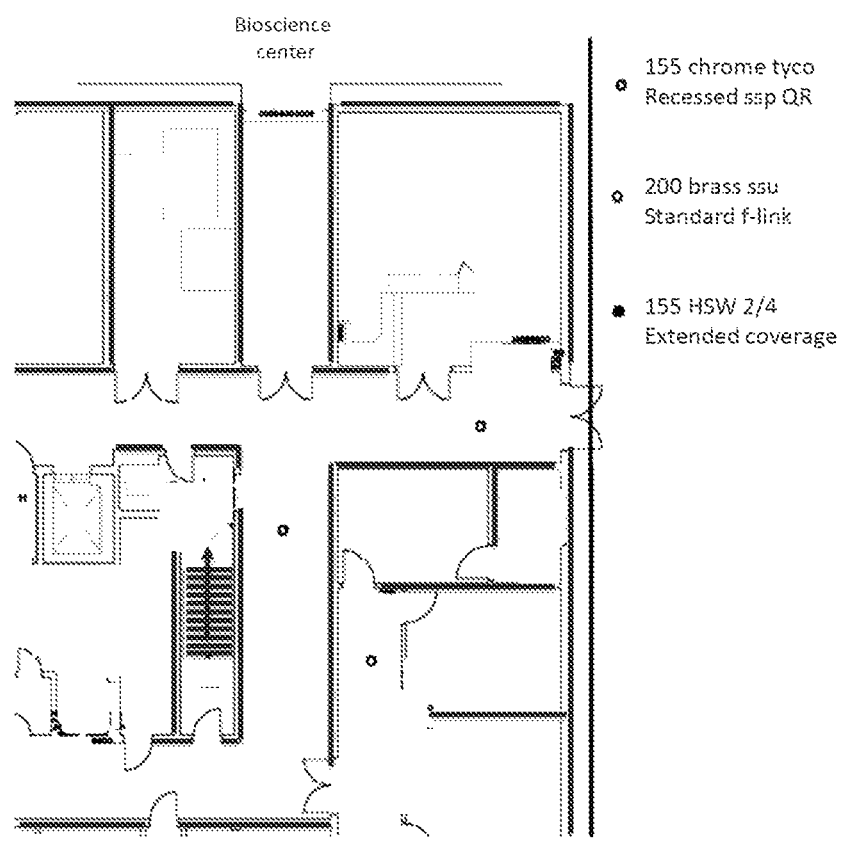
FIGS. 27-28 illustrate floor maps showing inspection discrepancies.
Figure 28:
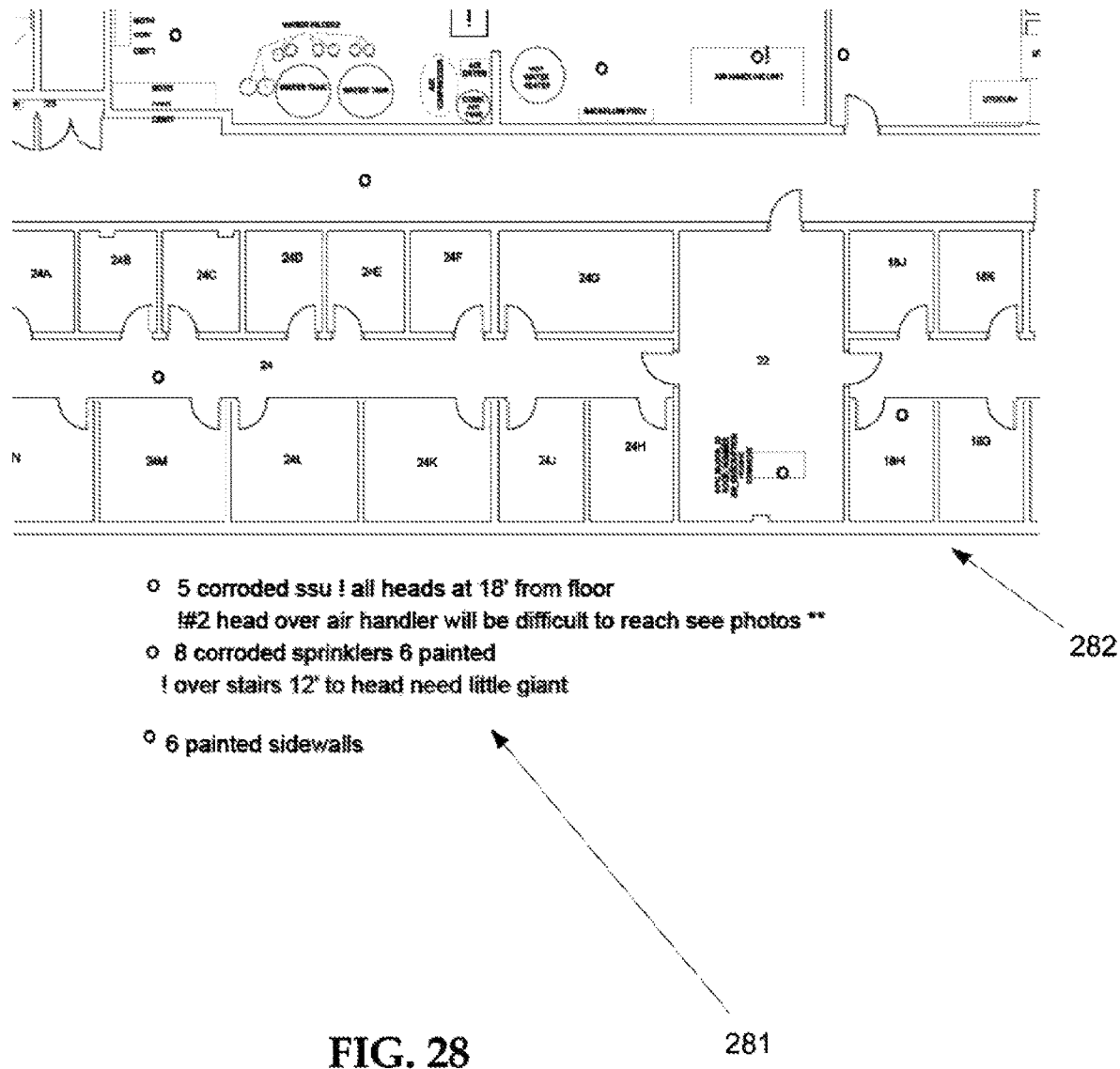
Figure 31:
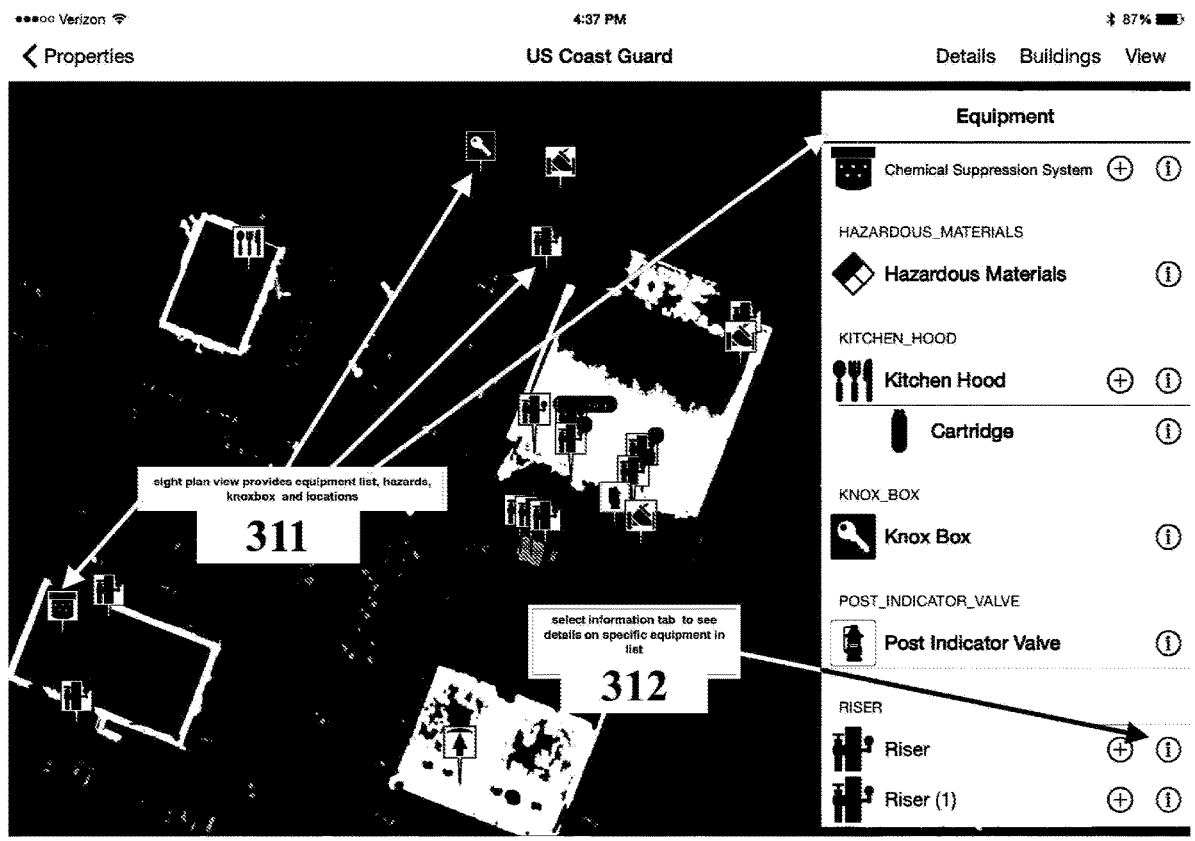
FIGS. 31-32 illustrate a representative fire department view.
Figure 32:
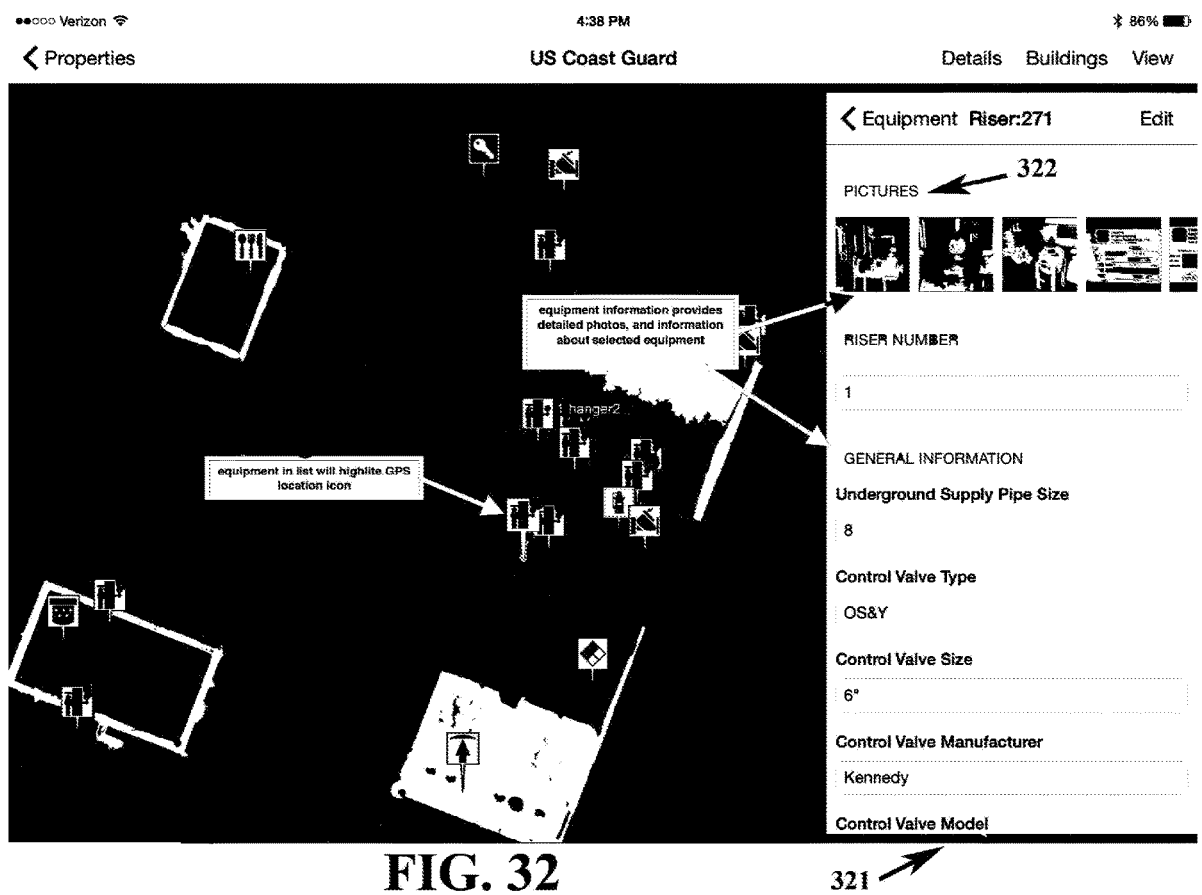

In FIG. 22, the user wants to add another icon to image 151. He first selects the location by clicking on the appropriate spot-on image 151 (FIG. 16) and selects the type of equipment represented by the icon by clicking on selection list 222. For example, in FIG. 23, the user has selected Fire Department Connection from list 222. The icon is then presented as icon 241 (FIG. 24). The user can then click on the icon to add information and photos in a fashion similar to that described above.

Figure 38:
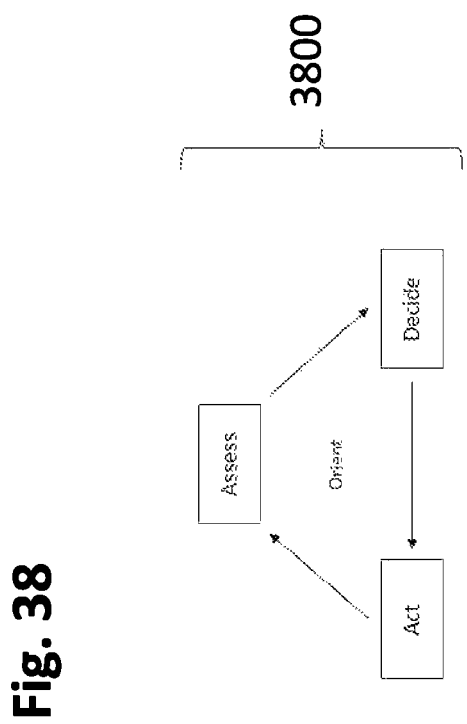
FIG. 38 illustrates a representative decision cycle for the use and maintenance of firefighting equipment.
Figure 39:
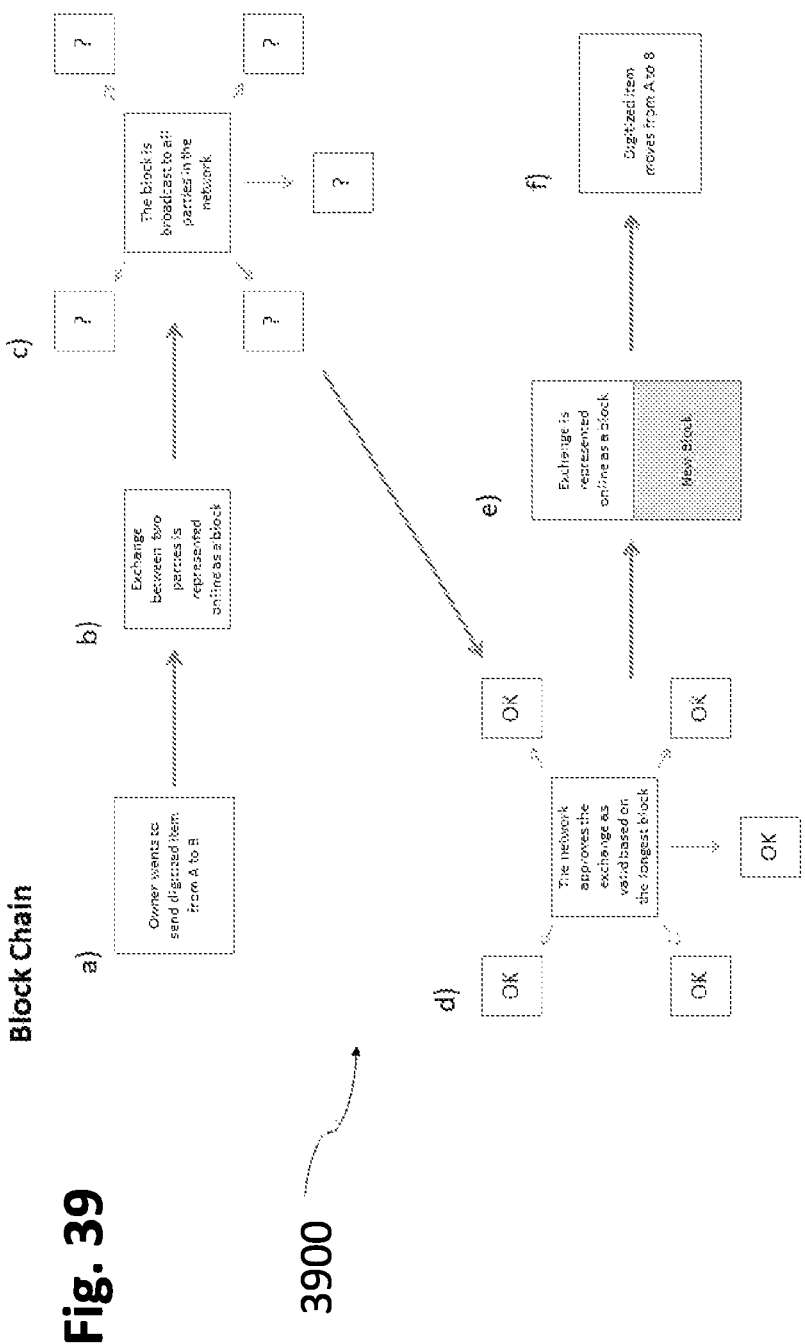
FIG. 39 illustrates blockchain used as an encryption option.
Figure 40A:
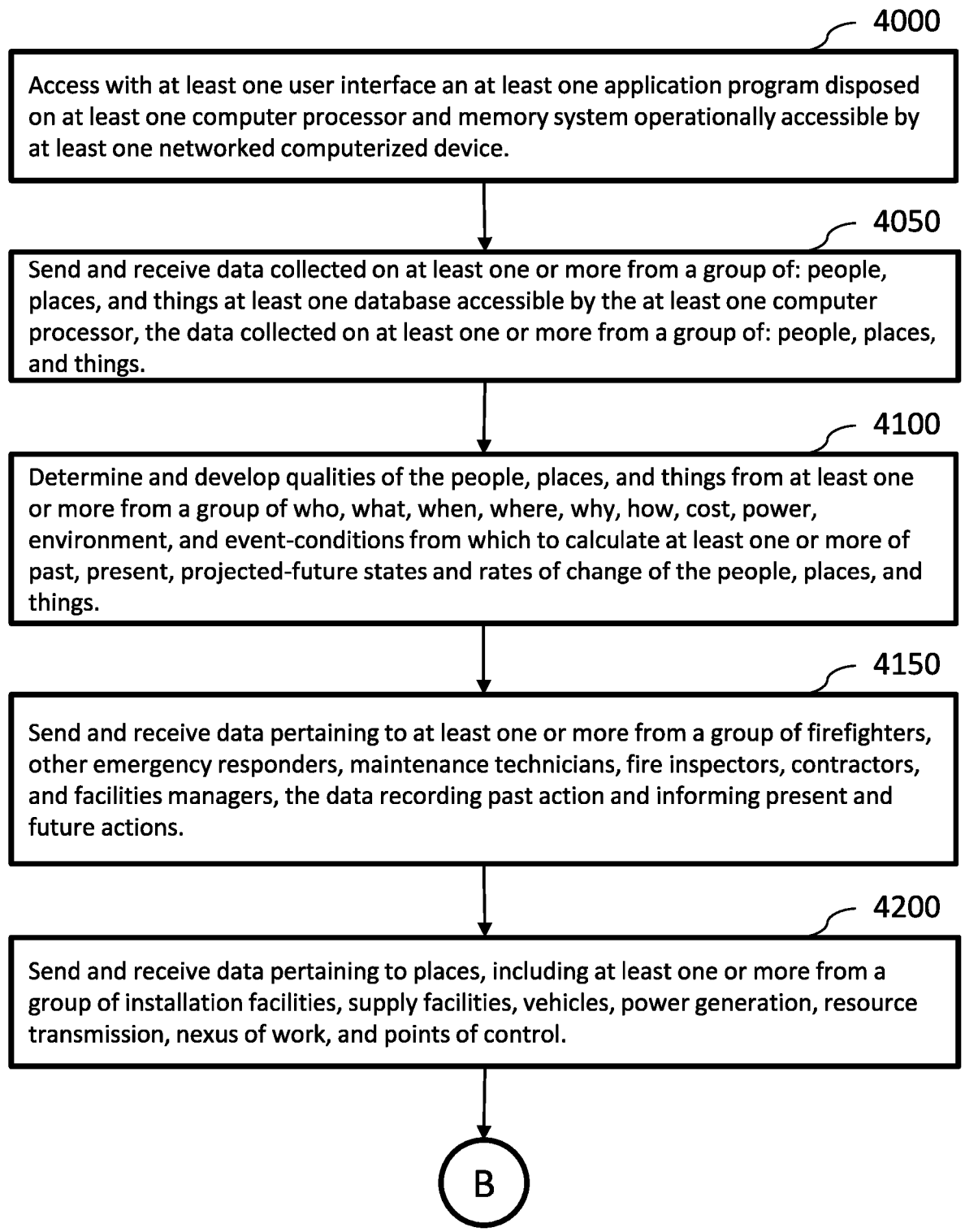
Figure 40C:
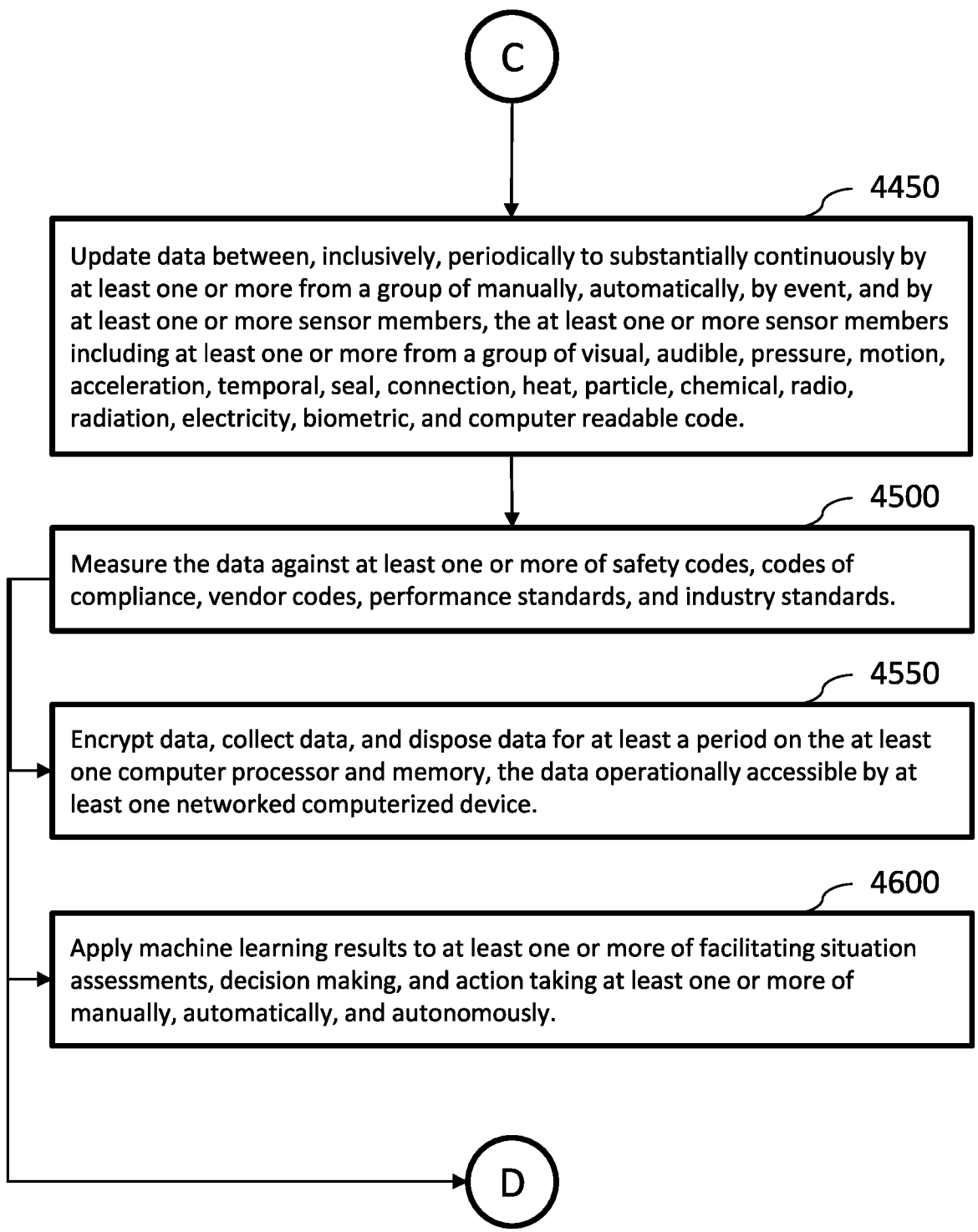
Figure 40D:
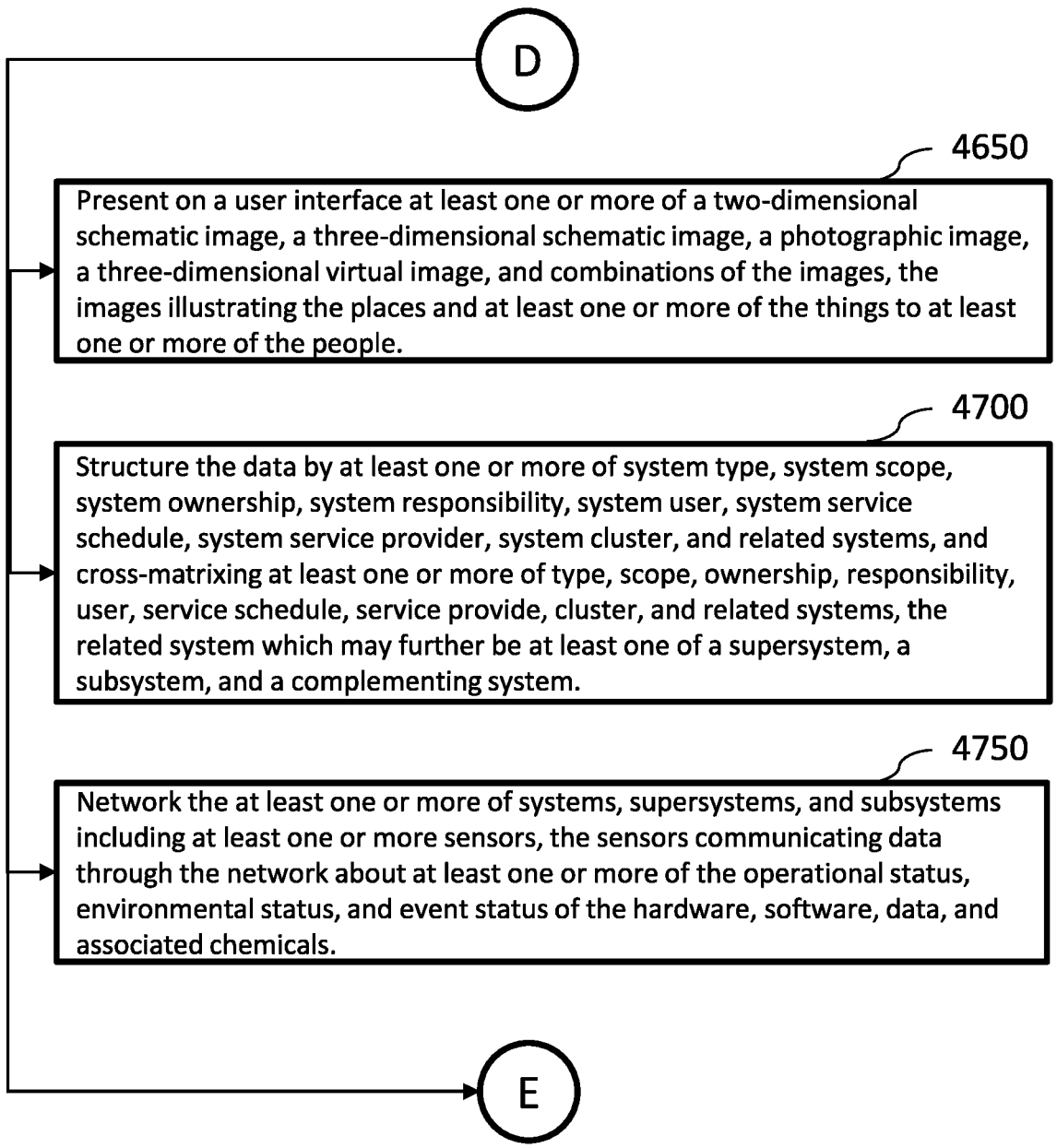
Figure 40E:
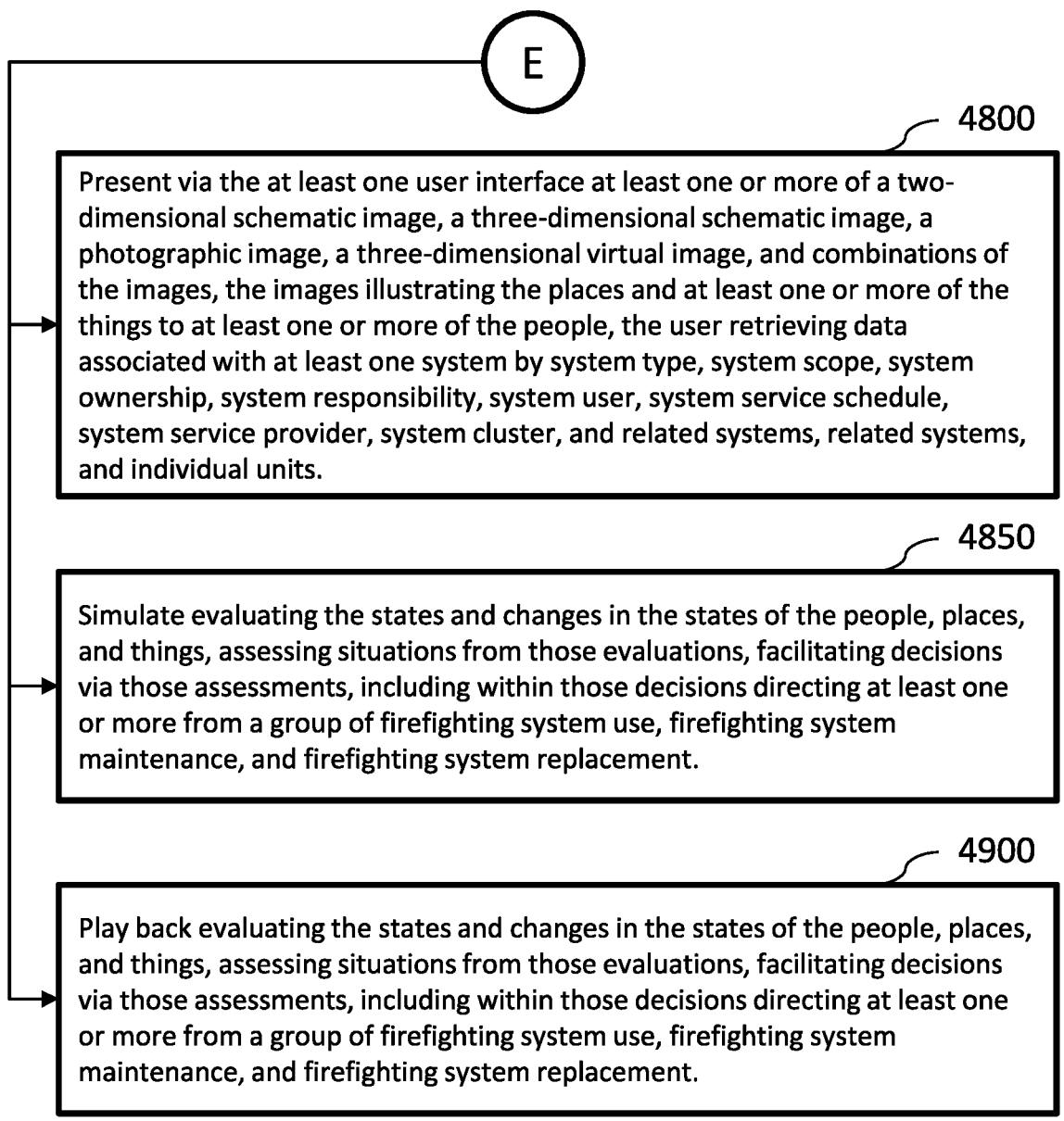

Important for the added inventive concept, as illustrated in FIGS. 37-40A-E is support of, as illustrated in FIG. 38, iterative decision cycles 3800 of assessment, decision, and action from a useful framework where, particularly in matters of firefighting and emergency response, the direction of users, and more specifically, users of the inventive concept, is to be able to proficiently make better decisions faster. A decision cycle 3800 may occur over several days or even years representing the cycle of installation, monitoring, and replacing a given tool or piece of firefighting equipment and may, at other times, occur in the split-second decisions made when fighting a fire, for example, finding the location of a working fire hydrant seconds faster than might otherwise have been possible without the inventive concept, allowing, therefore, water from that fire hydrant to be applied to a fire seconds to minutes earlier than otherwise. The inventive concept further allows decisions to be made earlier than otherwise by both raising the visibility to users of an area of operation, such as a building, and allowing users to make assessments and decisions while still enroute to that representative building. Better decisions made sooner and faster allow the sources of problems, such as fires, to be handled sooner than otherwise possible and, in some cases, prevented altogether.

In Internet of Things 3770 and machine learning 3760 embodiments of the inventive concept, users may further receive decision-support information where, rather than requiring users to conceive decisions from scratch, machine learning 3760 may present one or more options for the user to select or may remove the need for the user to make certain decisions so users can focus decision-making on those areas best suited for human judgements. Another structure for the decision cycle 3800 is observe, orient, decide, and act where the term observe is substantially synonymous with the term assess and where orient may also be termed as a framework, both orient and framework being at least one or more of structures, checklist, documents, and models to aid thinking that allow users to understand data they receive as needed to achieve an objective.

Further referring to the figures, FIG. 37 illustrates an added representative embodiment of a system for firefighting and fire prevention of structures that includes at least one computer processor and memory system 3700 operationally accessible by at least one networked computerized device 3720, the at least one computer processor 3700 and at least one network computerized device 3720 which may involve downloading application programming 341 and may involve downloading other app programming. Networking may be enabled via wireless communication 3725, including, but not limited to, wi-fi, Bluetooth, and cellular service such as 5G. At least one database 3799 is accessible by the at least one computer processor 3700 designed to send and receive data collected on at least one or more from a group of: the users 3731, and places 3733, and tools 3735, the data further including datapoints from which to calculate qualities of the users 3731, places 3733, and tools 3735 from at least one or more from a group of: who, what, when, where, why, how, cost, power, environment, and event-conditions from which to calculate at least one or more of past, present, and projected-future states and rates of change of the users 3731, places 3733, and tools 3735. The illustrated at least one computer processer 3700 may include, but is not limited to, server computers 334. The illustrated places 3733, and tools 3735, may include, but are not limited to, organizations 332 and properties 333. Users 3731 in the added embodiments may include, but are not limited to, primary customers 500 and secondary customers 501, and substantially correspond with people 331 in the original disclosure. Places 3733 and tools 3735 in the added embodiments may include, but are not limited to, fire inspection/repair/service companies 335 and fire departments 336. The at least one database 3799, in this representative embodiment, is at least one or more of entirely or partly in the cloud 800. Some embodiments may store data on local servers.

The data concerning states is at least one or more of text-base, image based, numbers based, and graphically based and may also be presented audibly. Data generally refers to information, such as measurements and statistics, used for reasoning, discussion, and calculations, and applications 341, in representative embodiments, allow primary customers 500 and, added, other users 3731 to collect, store, view, and access information from the central cloud database 800 and data which may, at least for a time, be stored locally.

The term user 3731 generally refers to human beings in general or considered collectively, and may, for the purpose of this disclosure, include a living asset working with users such as a dog, the dog extending the capabilities of the associated human beings. Users 3731 include at least one or more from a group of: firefighters, other emergency responders, maintenance technicians, fire inspectors, contractors, and facilities managers, including those aforementioned fire inspection/repair/service companies 335 and fire departments 336. Users 3731 may, in some embodiments, further include members of a business entity such as a corporation having facilities in which the inventive concept operates or a corporation that produces given tools 3735. Data about users 3731 may include, but is not limited to, customer resource management information such as name, address, organization, and district.

The term place 3733 generally refers to a particular position or point in space and may further be a location on or within a tool 3735. Places 3733 include at least one or more from a group of: installation facilities, supply facilities, vehicles, power generation, resource transmission, nexus of work, and points of control. Place 3733 may include city, property, building, floor, units, suites, and tenants.

Regarding qualities 3738, the term who generally refers to a person, people 331, and users 3731. The term what generally refers to an object or objects where an object may further be at least one or more of physical, virtual, and a concept. The term when generally refers to time. The term where generally refers to place where place may further be at least one or more of physical, virtual, and a concept. The term why generally refers to a reason. The term how generally refers to a condition. The term cost generally refers to an amount that would be paid. The term environment generally refers to surroundings or conditions. The term event-condition generally refers to an event part that specifies a signal that triggers an invocation of at least one rule, a condition part of that at least one rule that is a logical test that, if satisfied or evaluates to true, causes an action to be carried out, an action part that includes updates or invocations of data.

The term tool 3735 generally refers to an inanimate material object as distinct from a living sentient being. Tools 3735 in this disclosure include at least one or more systems, supersystems, and subsystems used at least one or more of for and in support of firefighting, fire prevention, fire detection, and alerting, a system including at least one or more of software, hardware, vehicles, data, and fire retarding chemicals. Tools 3735 may further include, but are not limited to, for tracking and identifying, equipment requiring compliance inspections such as fire sprinklers, standpipes, fire pumps, chemical suppression, extinguishers, trash chutes, fire doors, emergency lights, alarm systems, duct detectors, CO detectors, for auto notifications for non-compliant, past due, deficient, and out of service equipment. Tracking and notification process for compliance repairs incorporate fine procedures and progress tracking involving building representatives and maintenance contractors to populist progress reports and updated inspection documents and service company submission processes with standard-of-use documents for submissions. Such documents may be accessed by at least one or more users and may, for example, support inspections with multiple inspectors in different locations populating the same document and producing a report from the document. Supervisors, for example, may assign work areas and equipment for inspectors that include shared tools 3735 between different disciplines such as alarms and sprinklers, and users, 3731 will, therefore, see and share test results to avoid duplicate testing. Such adds efficiencies to compliance tracking, fund raising through fines, and can create backlogs for workloads justifying budgets and fire prevention man loading and are illustrated as frameworks and documents 3736.

The at least one computer processor and memory system 3700 is further networked to the at least one user interface 3710 wherein a user, inclusive of the aforementioned defined screens 10, 50, 60, 70, 80, 90, 91, 101, 120, 153, 154, and 155 and inclusive of the aforementioned defined customer 500, receives and can retrieve calculations of states of the users 3731, places 3733, and tools 3735 from which to assess situations, facilitate decision making, and take actions, the decisions and actions including at least one or more from a group of: firefighting system use, firefighting system maintenance, and firefighting system replacement, where at least one tool may be a system or part of a system, where action may be oriented toward achieving at least one objective, further supported by the associated frameworks and documents 3736.

FIG. 38 illustrates that assessment, decision, and action and how assessment, decision, and action are oriented may, as previously introduced, be termed the decision cycle 3800 where assessment is synonymous with observation. The term state generally refers to a particular condition that the given user 3731, place 3733, or tool 3735 is at a specific time and may include change, rates of change, and associated constants, such as the degradation of a given chemical over time, from which to make calculations.

One exemplary objective includes the dispatch of emergency vehicles to a fire where the computer 3700 processes situational data associated with the users 3731, places 3733, and tools 3735 to determine hazard response such as dispatching EMT vehicles, regular trucks, and specialty trucks—trucks with associated crews—at least one of the dispatched users 3731 receiving on the at least one user interface 3710 plans and situation information from which to assign crews and equipment and execute the plans. Vehicle members may have mobile fleet components 3736 that may be incorporated in analysis by the at least one computer system 3700 so mobile fleet components may be further considered during a given decision cycle 3800. For an example of a mobile fleet component assessment, a given tool 3735, such as a fire hose, which may be available in a facility, may also be available on a truck where the tool 3735 disposed on the truck may be the most expedient to access in a given situation.

FIG. 37 further illustrates that in the at least one user interface 3710, in one embodiment, access portals 3740 are included, and further include, but are not limited to, a property management Web portal 3742, a fire prevention Web portal 3744, and a fire service Web portal 3746. In this representative embodiment, via an administrative tool, a service manager app 3745 with varied permissions is directed toward users 3731 such as service managers responsible for maintaining systems and another fire department site plan app 3743 is directed toward users 3731 such as firefighters who would employ the system. In this representative embodiment, further, a property management app 3741 is further directed toward users 3731 handling assessments, decisions, and actions involving properties.

The data is at least one or more of pushed to the at least one user 3731 and pulled by the at least one user 3731, pull meaning the user 3731 takes at least one action to receive data and push meaning the user 3731 receives data without having to have requested that data. The data is updated between, inclusively, periodically to substantially continuously by at least one or more from a group of: manually, automatically, by event, and by at least one or more sensor members 3750, the at least one or more sensor members 3750 including at least one or more from a group of: visual, audible, pressure, motion, acceleration, temporal, seal, connection, particle, chemical, radio, radiation, electricity, position, temperature, force, vibration, piezo, fluid property, humidity, biometric, global positioning, and computer readable code. The data is measured against assemblies of codes and standards 3737, including at least one or more of safety codes, codes of compliance, vendor codes, performance standards, and industry standards. Measuring data may occur during at least one or more of inspections and operations.

In one embodiment of the system for firefighting and fire prevention of structures, the collected data is recorded at least one or more of unencrypted, encrypted, encrypted with blockchain 3900, and encrypted with biometrics, the recorded data disposed for at least a period on the at least one computer processor and memory 3700, the data operationally accessible by at least one networked computerized device 3720.

Blockchain 3900 is a digital database containing information that can be simultaneously used and shared within a large, decentralized, publicly accessible network. As used herein, in some embodiments, the term blockchain may refer to one or more of a hash chain, a hash tree, a distributed database, and a distributed ledger that could present a cryptographically verifiable ledger. In some embodiments, blockchain may further refer to systems that use one or more of cryptography, private/public key encryption, proof standard, distributed timestamp server, and inventive schemes to regulate how new blocks may be added to the chain to use and maintain at least one or more systems, subsystems, and supersystems. For example, blockchain 3900 in some embodiments, when used operationally, may add new code to a hash chain whenever data indicates an event-condition. Any change received or recorded involving data may trigger adding code to a hash chain, creating a new branch on a hash tree, and other blockchain 3900 actions.

In one embodiment of the system for firefighting and fire prevention of structures, the data is processed by, as previously noted, machine learning 3760 to facilitate situation assessment, decision making, and action taking of at least one or more of manual, automatic, and autonomous operations. Machine learning 3760 involves the use and development of computer systems that can learn and adapt without following explicit instructions by using algorithms and statistical models to analyze and draw inferences from patterns in data. Machine learning algorithms may include, but are not limited to, decision trees, neural networks, Bayesian models, and genetic algorithms, and in some embodiments, may be derived from preset or partially preset libraries.

In one embodiment of the system for firefighting and fire prevention of structures, the at least one user interface 3710 presents at least one or more of a two-dimensional schematic image, a three-dimensional schematic image, a photographic image, a three-dimensional virtual image, a holographic image, a projected image, and combinations of the images, images that may include GPS and satellite images, the images designed to illustrate the places 3733 involved in a given operation and at least one or more of the tools 3735 to at least one or more of the users 3731. Images include both static images and representative motion created by sequences of at least two images.

A system generally refers to a set of tools 3735 working together as parts of a mechanism or an interconnecting network where the system may include users 3731 of the tools 3735 and may include the places 3733, and where operation of the system may further require data as disclosed herein. In one representative embodiment of the system for firefighting and fire prevention of structures, the data is structured by at least one or more of system type, system scope, system ownership, system responsibility, system user, system service schedule, system service provider, system cluster, and related systems, the related systems which may further be cross matrixed by at least one or more of type, scope, ownership, responsibility, user, service schedule, service provider, cluster, and related systems, the related systems which may further be at least one of a supersystem, a subsystem, and a complementing system. Machine learning 3760, in addition to assessing data, may assess organization of data and how data is categorized.

In one embodiment of the system for firefighting and fire prevention of structures, at least one or more of systems, supersystems, and subsystems are networked, and hardware includes the at least one or more sensor members 3750 designed to communicate data through the network about at least one or more of the operational status, environmental status, and event status of the hardware, software, vehicles, data, and associated chemicals. This embodiment may be or include elements of, as previously noted, the Internet of Things (IoT) 3770. IoT 3770 generally refers to the interconnection via the internet of computing devices embedded in tools 3735, enabling those tools to send and receive data.

In one embodiment of the system for firefighting and fire prevention of structures, the at least one user interface 3710 presents at least one or more of a two-dimensional schematic image, a three-dimensional schematic image, a photographic image, a three-dimensional virtual image, a holographic image, a projected image, and combinations of the images, the images designed to illustrate the places 3733 and at least one or more of the tools 3735 to at least one or more of the users 3731. The users 3731 may retrieve data associated with at least one system by system type, system scope, system ownership, system responsibility, system user, system service schedule, system service provider, system cluster, related systems, and individual units.

In one embodiment of the system for firefighting and fire prevention of structures, the states and changes in the states of the users 3731, places 3733, and tools 3735 from which to assess situations, facilitate decision making, and take actions—the decisions and actions including at least one or more from the group of: firefighting system use, firefighting system maintenance, and firefighting system replacement—are simulated via at least one simulator app 3790. Simulating may be used to test configurations and deployments of users 3731, places 3733, and tools 3735 in given scenarios and may be performed as a method. Simulations may also be used to test recommendations ahead of providing recommendations in real-time situations. Simulations are run on computers and are at least one or more of manually run, for example, users 3731 making decisions and computers simulating the results, and autonomously, for example, machine learning 3760 components of artificial intelligence testing decisions, actions, and evaluating results.

In one embodiment of the system for firefighting and fire prevention of structures, the states and changes in the states of the users 3731, places 3733, and tools 3735 from which to assess situations and facilitate decisions—the decisions including at least one or more from the group of: firefighting system use, firefighting system maintenance, and firefighting system replacement—are played back using at least one playback app 3792. Playing back may be used in such situations as performing after action reviews and may also be used to train users 3731 and train machine learning 3760.

One representative embodiment of the inventive concept includes virtual private networks 3795. This representative embodiment may include, but is not limited to, servers for development, staging, and production. Servers and databases may be structured in a variety of configurations in other embodiments of the inventive concept.

The term pertaining generally means to be appropriate, related, or applicable, further meaning the data is at least one or more of used for operations and is created by states pertaining to the associated users 3731, places 3733, and tools 3735.

FIGS. 40A-E illustrate that one representative embodiment of the inventive concept is a method for firefighting and fire prevention of structures that includes the step of 4000, accessing with at least one user interface the at least one application program 341 disposed on the at least one computer processor and memory system 3700 operationally accessible by at least one networked computerized device. The method further includes the step of 4050, sending and receiving data collected on at least one or more from the group of: users 3731, places 3733, and tools 3735, the at least one database 3799 accessible by the at least one computer processor 3700, the data collected on at least one or more from the group of: users 3731, places 3733, and tools 3735. The method further includes the step of 4100, at least one or more of determining and developing qualities 3738 of the users 3731, places 3733, and tools 3735 from at least one or more from the group of: who, what, when, where, why, how, cost, power, environment, and event-conditions from which to calculate at least one or more of the past, present, and projected-future states and rates of change of the users 3731, places 3733, and tools 3735.

FIGS. 40A-E illustrate that the method further includes the step of 4150, sending and receiving data pertaining to at least one or more from the group of: firefighters, other emergency responders, maintenance technicians, fire inspectors, contractors, and facilities managers, the data recording past action and informing present and future actions. The method further includes the step of 4200, sending and receiving data pertaining to places 3733 including at least one or more from the group of: installation facilities, supply facilities, vehicles, power generation, resource transmission, nexus of work, and points of control. The method further includes the step of 4250, sending and receiving data pertaining to tools 3735 including at least one or more systems, supersystems, and subsystems used at least one or more of for and in support of firefighting, fire prevention, fire detection, and alerting, the system including at least one or more of software, hardware, vehicles, data, and fire retarding chemicals.

The method further includes the step of 4300, calculating from the data states of the users 3731, places 3733, and tools 3735 from which to assess situations, facilitate decision making, and take actions, the decisions and actions including at least one or more from the group of: firefighting system use, firefighting system maintenance, and firefighting system replacement. The method further includes the step of 4350, from the calculations of states, assessing, deciding, and acting on situations for at least one cycle of assessing, deciding and acting.

The method further includes the step of 4400, the at least one computer processor and memory system 3700 further networking to the at least one user interface 3710 wherein the user 3731 receives and can retrieve the data at least one or more of pushed to the at least one user 3731 and pulled by the at least one user 3731. The method further includes the step of 4450, the data updating between, inclusively, periodically to substantially continuously by at least one or more from the group of: manually, automatically, by event, and by at least one or more of the sensor members 3750, the at least one or more sensor members 3750 including at least one or more from the group of: visual, audible, pressure, motion, acceleration, temporal, seal, connection, heat, particle, chemical, radio, radiation, electricity, biometric, global positioning, and computer readable code. The method further includes the step of 4500, measuring the data against at least one or more of the safety codes, codes of compliance, vendor codes, performance standards, and industry standards.

The method may further include the step of 4550, encrypting data, collecting data, and disposing data for at least a period on the at least one computer processor and memory 3700, the data operationally accessible by the at least one networked computerized device.

The method may further include the step of 4600, applying the machine learning 3760 results to at least one or more of facilitating situation assessments, decision making, and action taking at least one or more of manually, automatically, and autonomously.

The method may further include the step of 4650, presenting on the user interface 3710 at least one or more of a two-dimensional schematic image, a three-dimensional schematic image, a photographic image, a three-dimensional virtual image, a holographic image, a projected image, and combinations of the images, the images illustrating the places 3733 and at least one or more of the tools 3735 to at least one or more of the users 3731.

The method may further include the step of 4700, structuring the data by at least one or more of the system type, system scope, system ownership, system responsibility, system user, system service schedule, system service provider, system cluster, and related systems, and cross-matrixing at least one or more of type, scope, ownership, responsibility, user, service schedule, service provider, cluster, and related systems, the related systems which may further be at least one or more of a supersystem, a subsystem, and a complementing system.

The method may further include the step of 4750, networking the at least one or more of systems, supersystems, and subsystems including at least one or more of the operational sensors, the operational sensors communicating data through the network about at least one or more of the operational status, environmental status, and event status of the hardware, software, data, and associated chemicals.

The method may further include the step of 4800, the at least one user interface presenting at least one or more of a two-dimensional schematic image, a three-dimensional schematic image, a photographic image, a three-dimensional virtual image, a holographic image, a projected image, and combinations of the images, the images illustrating the places 3733 and at least one or more of the tools 3735 to at least one or more of the users 3731, the user retrieving data associated with the at least one system by system type, system scope, system ownership, system responsibility, system user, system service schedule, system service provider, system cluster, related systems, and individual units.

The method may further include the step of 4850, simulating evaluating the states and changes in the states of the users 3731, places 3733, and tools 3735, assessing situations from those evaluations, facilitating decisions via those assessments, including within those decisions directing at least one or more from the group of: firefighting system use, firefighting system maintenance, and firefighting system replacement. Simulations may be used both to test assessments, decisions, and actions on fictional operations and to improve actual operations by simulating how decisions will turn out before enacting those decisions.

The method may further include the step of 4900, playing back evaluating the states and changes in the states of the users 3731, places 3733, and tools 3735, assessing situations from those evaluations, facilitating decisions via those assessments, including within those decisions directing at least one or more from the group of: firefighting system use, firefighting system maintenance, and firefighting system replacement.

The following patents are incorporated by reference in their entirety: U.S. Pat. Nos. 5,950,150A, 8,311,510B2, 8,311,510B2, 9,478,121B2, 9,672,486B2, 9,767,679B2, 10,166,421B2, 10,831,167B2, 10,885,771B2, 11,169,678B2, 11,232,702B2, US20080084291A1, US20090183123A1, US20120320058A1, US20170104823A1, US20210223767A1, WO2009105603, CN209248719U.

While the inventive concept has been described above in terms of specific embodiments, it is to be understood that the inventive concept is not limited to these disclosed embodiments. Upon reading the teachings of this disclosure many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A system for firefighting and fire prevention of structures comprising:
    at least one computer processor and memory system operationally accessible by at least one networked computerized device, the networked computerized device further adapted to at least one or more of collect, store, present, and access information from a central cloud database to at least one primary customer, adapted to allow at least one secondary customer to view and update in real-time information about at least one property, building, and safety equipment, and adapted to allow at least one fire department to view at least one or more of properties, people, and organizations, further adapted to allow fire departments to access property maps, firefighting equipment exact location, fire equipment condition, and the date fire equipment was last inspected from which to direct the actions of fire fighters at the scene;
    equipment located on maps by way of at least one or more of satellite and global positioning system;
    at least one database accessible by the at least one computer processor adapted to send and receive data collected on at least one or more from a group of: users, places, and tools, the data further including qualities of the users, places, and tools from at least one or more from a group of: who, what, when, where, why, how, cost, power, environment, and event-conditions from which to calculate at least one or more of past, present, projected-future states and rates of change of the users, places, and tools;
    users including at least one or more from a group of: firefighters, other emergency responders, maintenance technicians, fire inspectors, contractors, facilities managers, and members of associated business entities;
    places including at least one or more from a group of: installation facilities, supply facilities, vehicles, power generation, resource transmission, nexus of work, and points of control;
    tools including at least one or more systems, supersystems, and subsystems including at least one or more of system type, system scope, system ownership, system responsibility, system user, system service schedule, system service provider, system cluster, and related systems used at least one or more of for and in support of firefighting, fire prevention, fire detection, and alerting, a system including at least one or more of software, hardware, vehicles, data, and fire retarding chemicals, the system further connected by at least one Internet of Things network adapted to provide at least one or more of structures, checklist, documents, and models of data pertaining to at least one objective;
    the at least one computer processor and memory system further networked to at least one user interface and at least one application program wherein a user receives and can retrieve calculations of states of the users, places, and tools from which to assess situations, facilitate decisions, and take actions, the decisions and actions including at least one or more from a group of: firefighting system use, firefighting system maintenance, and firefighting system replacement;
    the data at least one or more of pushed to the at least one user and pulled by the at least one user;
    the data updated between inclusively periodically to substantially continuously by at least one or more from a group of: manually, automatically, by event, and by at least one or more sensor members, the at least one or more sensor members including at least one or more from a group of: visual, audible, pressure, motion, acceleration, temporal, seal, connection, heat, particle, chemical, radio, radiation, electricity, biometric, global positioning, and computer readable code; and
    the data measured against at least one or more of safety codes, codes of compliance, vendor codes, performance standards, and industry standards.

2. The system for firefighting and fire prevention of structures of claim 1 wherein the collected data is recorded at least one or more of unencrypted, encrypted, encrypted with blockchain, and biometrically encrypted, the recorded data disposed for at least a period on the at least one computer processor and memory and operationally accessible by at least one networked computerized device.

3. The system for firefighting and fire prevention of structures of claim 1 wherein the data is processed by machine learning to facilitate situation assessment, decision making, and action taking of at least one or more of manual, automatic, and autonomous operations, machine learning adapted to test recommendations ahead of providing recommendations in real-time situations by simulating the real-time simulation, simulations testing decisions, actions, and evaluating results.

4. The system for firefighting and fire prevention of structures of claim 1 wherein the at least one user interface presents at least one or more of a two-dimensional schematic image, a three-dimensional schematic image, a photographic image, a three-dimensional virtual image, a holographic image, a projected image, and combinations of the images, the images adapted to illustrate the places and at least one or more of the tools to at least one or more of the users.

5. The system for firefighting and fire prevention of structures of claim 1 wherein the data is structured by at least one or more of system type, system scope, system ownership, system responsibility, system user, system service schedule, system service provider, system cluster, and related systems, the related systems which may further be cross matrixed by at least one or more of type, scope, ownership, responsibility, user, service schedule, service provider, cluster, and related systems, the related systems which may further be at least one of a supersystem, a subsystem, and a complementing system.

6. The system for firefighting and fire prevention of structures of claim 1 wherein at least one or more of the systems, supersystems, and subsystems are networked and wherein hardware includes at least one or more operational sensors adapted to communicate data through the network about at least one or more of the operational status, environmental status, and event status of the hardware, software, vehicles, data, and associated chemicals.

7. The system for firefighting and fire prevention of structures of claim 1 wherein the at least one user interface presents at least one or more of a two-dimensional schematic image, a three-dimensional schematic image, a photographic image, a three-dimensional virtual image, a holographic image, a projected image, and combinations of the images, the images adapted to illustrate the places and at least one or more of the tools to at least one or more of the users, wherein the user may retrieve data associated with at least one system by system type, system scope, system ownership, system responsibility, system user, system service schedule, system service provider, system cluster, related systems, and individual units.

8. The system for firefighting and fire prevention of structures of claim 1 wherein the states and changes in the states of the users, places, and tools from which to assess situations and facilitate decisions—the decisions including at least one or more from the group of: firefighting system use, firefighting system maintenance, and firefighting system replacement—are simulated.

9. The system for firefighting and fire prevention of structures of claim 1 wherein the states and changes in the states of the users, places, and tools from which to assess situations and facilitate decisions—the decisions including at least one or more from the group of: firefighting system use, firefighting system maintenance, and firefighting system replacement—are played back.

10. A method for firefighting and fire prevention of structures comprising:
accessing with at least one user interface an at least one application program disposed on at least one computer processor and memory system operationally accessible by at least one networked computerized device, collecting, storing, presenting, and accessing information from a central cloud database by way of the networked computerized device, allowing at least one secondary customer to view and update in real-time information about at least one property, building, and safety equipment, and allowing at least one fire department to view at least one or more of properties, people, and organizations, the fired departments accessing property maps, firefighting equipment exact location, fire equipment condition, and the date fire equipment was last inspected and directing the actions of fire fighters at the scene;
locating equipment on maps by way of at least one or more of satellite and global positioning system;
sending and receiving data collected on at least one or more from a group of: users, places, and tools at least one database accessible by the at least one computer processor, the data collected on at least one or more from a group of: users, places, and tools;
at least one or more of determining and developing from datapoints qualities of the users, places, and tools from at least one or more from a group of: who, what, when, where, why, how, cost, power, environment, and event-conditions from which to calculate at least one or more of past, present, and projected-future states and rates of change of the users, places, and tools;
sending and receiving data pertaining to at least one or more from a group of: firefighters, other emergency responders, maintenance technicians, fire inspectors, contractors, and facilities managers, the data recording past action and informing present and future actions;
sending and receiving data pertaining to places including at least one or more from a group of: installation facilities, supply facilities, vehicles, power generation, resource transmission, nexus of work, and points of control;
sending and receiving data pertaining to tools including at least one or more systems, supersystems, and subsystems used at least one or more of for and in support of firefighting, fire prevention, fire detection, and alerting, a system including at least one or more of software, hardware, vehicles, data, and fire retarding chemicals, further connecting the system by at least one Internet of Things network adapted to provide at least one or more of structures, checklist, documents, and models of data pertaining to at least one objective;
calculating from the data states of the users, places, and tools from which to assess situations, facilitate decision making, and take actions, the decisions and actions including at least one or more from a group of: firefighting system use, firefighting system maintenance, and firefighting system replacement;
from the calculations of states, assessing, deciding, and acting on situations for at least one cycle of assessing, deciding and acting;
the at least one computer processor and memory system further networking to at least one user interface wherein a user receives and can retrieve the data at least one or more of pushed to the at least one user and pulled by the at least one user;
the data updating between, inclusively, periodically to substantially continuously by at least one or more from a group of: manually, automatically, by event, and by at least one or more sensor members, the at least one or more sensor members including at least one or more from a group of: visual, audible, pressure, motion, acceleration, temporal, seal, connection, heat, particle, chemical, radio, radiation, electricity, biometric, global positioning, and computer readable code; and
measuring the data against at least one or more of safety codes, codes of compliance, vendor codes, performance standards, and industry standards.

11. The method for firefighting and fire prevention of structures of claim 10, the method further including encrypting data, collecting data, and disposing data for at least a period on the at least one computer processor and memory, the data operationally accessible by at least one networked computerized device.

12. The method for firefighting and fire prevention of structures of claim 10, the method further including applying machine learning results to at least one or more of facilitating situation assessments, decision making, and action taking at least one or more of manually, automatically, and autonomously, machine learning testing recommendations ahead of providing recommendations in real-time situations by simulating the real-time simulation, simulations testing decisions, simulating actions, and evaluating results.

13. The method for firefighting and fire prevention of structures of claim 10, the method further including presenting on a user interface at least one or more of a two-dimensional schematic image, a three-dimensional schematic image, a photographic image, a three-dimensional virtual image, a holographic image, a projected image, and combinations of the images, the images illustrating the places and at least one or more of the tools to at least one or more of the users.

14. The method for firefighting and fire prevention of structures of claim 10, the method further including structuring the data by at least one or more of system type, system scope, system ownership, system responsibility, system user, system service schedule, system service provider, system cluster, and related systems, and cross-matrixing at least one or more of type, scope, ownership, responsibility, user, service schedule, service provider, cluster, and related systems, the related systems which may further be at least one of a supersystem, a subsystem, and a complementing system.

15. The method for firefighting and fire prevention of structures of claim 10, the method further including networking the at least one or more of systems, supersystems, and subsystems including the at least one or more operational sensors, the operational sensors communicating data through the network about at least one or more of the operational status, environmental status, and event status of the hardware, software, vehicles, data, and associated chemicals.

16. The method for firefighting and fire prevention of structures of claim 10, the method further including the at least one user interface presenting at least one or more of a two-dimensional schematic image, a three-dimensional schematic image, a photographic image, a three-dimensional virtual image, a holographic image, a projected image, and combinations of the images, the images illustrating the places and at least one or more of the tools to at least one or more of the users, the users retrieving data associated with at least one system by system type, system scope, system ownership, system responsibility, system user, system service schedule, system service provider, system cluster, and related systems, and individual units.

17. The method for firefighting and fire prevention of structures of claim 10, the method further including simulating evaluating the states and changes in the states of the users, places, and tools, assessing situations from those evaluations, facilitating decisions via those assessments, including within those decisions directing at least one or more from the group of: firefighting system use, firefighting system maintenance, and firefighting system replacement.

18. The method for firefighting and fire prevention of structures of claim 10, the method further including playing back evaluating the states and changes in the states of the users, places, and tools, assessing situations from those evaluations, facilitating decisions via those assessments, including within those decisions directing at least one or more from the group of: firefighting system use, firefighting system maintenance, and firefighting system replacement.

\* \* \* \* \*